United States Patent
Yarygin et al.

(10) Patent No.: US 12,445,421 B2
(45) Date of Patent: Oct. 14, 2025

(54) APPARATUS, METHODS, AND SYSTEMS FOR PRE-AUTHENTICATION, KEEP-AUTHENTICATION, AND REGAIN-AUTHENTICATION

(71) Applicant: Analog Devices, Inc., Wilmington, MA (US)

(72) Inventors: Sergey V. Yarygin, San Jose, CA (US); Gyudong Kim, San Jose, CA (US); Chandlee Harrell, Los Altos, CA (US)

(73) Assignee: Analog Devices, Inc., Wilmington, MA (US)

( * ) Notice: Subject to any disclaimer, the term of this patent is extended or adjusted under 35 U.S.C. 154(b) by 828 days.

(21) Appl. No.: 17/545,702

(22) Filed: Dec. 8, 2021

(65) Prior Publication Data
US 2023/0179584 A1 Jun. 8, 2023

(51) Int. Cl.
*H04L 9/40* (2022.01)
*H04L 9/06* (2006.01)
*H04L 9/32* (2006.01)
*H04N 21/426* (2011.01)

(52) U.S. Cl.
CPC ............ *H04L 63/08* (2013.01); *H04L 9/0637* (2013.01); *H04L 9/32* (2013.01); *H04L 63/0428* (2013.01); *H04L 63/0464* (2013.01); *H04N 21/42623* (2013.01); *H04L 2209/122* (2013.01); *H04L 2209/34* (2013.01)

(58) Field of Classification Search
CPC ....... H04L 63/08; H04L 9/32; H04L 63/0428; H04L 63/0464; H04L 9/0637; H04L 2209/122; H04L 2209/34; H04N 21/42623
See application file for complete search history.

(56) References Cited

U.S. PATENT DOCUMENTS

| | | | |
|---|---|---|---|
| 7,088,398 B1* | 8/2006 | Wolf | H04L 1/206 348/478 |
| 8,374,346 B2 | 2/2013 | Choi et al. | |
| 8,713,213 B1 | 4/2014 | Yildiz et al. | |
| 9,143,507 B2 | 9/2015 | Choi et al. | |
| 9,779,687 B2 | 10/2017 | Park et al. | |
| 2002/0069380 A1* | 6/2002 | El-Maleh | H04L 1/0046 714/704 |
| 2008/0148063 A1* | 6/2008 | Hanko | H04N 5/913 375/E7.009 |
| 2009/0222905 A1* | 9/2009 | Choi | G11B 20/00463 726/11 |

FOREIGN PATENT DOCUMENTS

WO 2015/137751 9/2015

OTHER PUBLICATIONS

Digital Content Protection LLC, "High-bandwidth Digital Content Protection System, Mapping HDCP to HDMI, Revision 2.3," Feb. 28, 2018, pp. 1-84, https://www.digital-cp.com/hdcp-specifications.
Digital Content Protection LLC, "High-bandwidth Digital Content Protection System, Revision 1.4," Jul. 8, 2009, pp. 1-90, https://www.digital-cp.com/hdcp-specifications.

* cited by examiner

Primary Examiner — Cheng-Feng Huang
(74) Attorney, Agent, or Firm — ArentFox Schiff LLP

(57) ABSTRACT

Authentication is a key element for content protection. This invention makes the authentication fast and reliable by hiding the authentication, keeping the authentication, and regaining the lost authentication. The embodiments in this invention reduce the complexity and power consumption of the operation significantly.

20 Claims, 15 Drawing Sheets

APPARATUS, METHODS, AND SYSTEMS FOR PRE-AUTHENTICATION, KEEP-AUTHENTICATION, AND REGAIN-AUTHENTICATION

FIELD OF THE DISCLOSURE

The present disclosure relates to HDMI authentication and content protection. More specifically, this disclosure describes apparatuses, methods and systems providing fast, reliable authentication by hiding the authentication, keeping the authentication, and regaining the lost authentication.

BACKGROUND

HDMI is an Audio/Video (AV) interface standard for transmitting uncompressed (or visually loss-less compressed) video data and compressed/uncompressed audio data. AV on HDMI interface is protected by High-bandwidth Digital Content Protection (HDCP). HDCP authenticates Sink and provides mechanism for encryption/decryption of HDMI data. HDMI Source encrypts AV and HDMI Sink decrypts data.

In the operation of a system that utilizes multiple data streams, such as multiple media data streams for display. The data may include data protected by High-bandwidth Digital Content Protection data, which is referred to herein as HDCP data. Thus, a system may include transmission of encoded stream that require deciphering. The process of deciphering HDCP data requires authentication, which can be time consuming. This generally results in a delay before the data may be viewed or heard, thereby interfering with the use and enjoyment of a system.

HDCP is a content protection protocol that is used to protect media content, particularly premium media content. For example, when there is flow of content between transmitting device (the HDMI Source, e.g., a DVD player) and a receiving device (the HDMI Sink, e.g., a television) via the High-Definition Multimedia Interface (HDMI) interface, the premium media content flowing is typically protected. The receiving device is validated and authenticated before being enabled to receive such media content from the transmitting device. This validation and authentication of the two devices is performed by exchanging some initial verification data (e.g., public/private keys), which in practical cases may last a few seconds.

Each time a Source is connected to a Sink, a new validation/authentication process is run. For example, if the receiving device is now connected to another transmitting device (e.g., digital camera), the Source validates the Sink by running the authentication before the protected media content can be communicated between them. This process is time-consuming.

Additionally, HDMI Sinks have limited ability to detect and signal HDCP decryption failures. In HDCP 1.x, an authentication integrity check is performed by Sources that periodically (once in up to 2 seconds) reads an Ri' value from the Sink and compares it with an expected Ri value calculated at the transmitter side. If they mismatch, it signals that authentication is lost and the link is no longer secure. This mechanism is slow as it may take up to 2 seconds before the Source detects the problem and takes action. Moreover, short bursts of link errors may be missed since the check is not continuous. The user may see "snow" noise and other types of distortions. In HDCP 2.x, the authentication integrity check is performed by the Sinks. However, there is no requirement on how often the Sinks have to perform such a check. In this case, the time duration that the user may see "snow" noise and other types of distortions caused by the broken authentication depends on the Sink implementation. Worse yet, in both HDCP 1.x and 2.x, when such broken authentication is detected by the Source as in HDCP 1.x or reported by the Sink as in HDCP 2.x, Sources may or may not take actions to correct the problem in a timely manner.

It is, therefore, desirable to have an HDCP recovery mechanism that re-synchronizes the Source HDCP encryption and the Sink HDCP decryption engines in order to maintain the authenticated state without spending time on signaling an error detection result from Sink to Source and performing re-authentication or other restarts at the transmitter or receiver sides. In cases where a device includes multiple HDMI ports, it is also desirable to hide the authentication process from the user by performing it in the "background", e.g. performing it during the time when an input port is not currently selected by the user for viewing.

This overview is intended to introduce the subject matter of the present patent application. It is not intended to provide an exclusive or exhaustive explanation of the invention. Further limitations and disadvantages of conventional and traditional approaches will become apparent to one of skill in the art, through comparison of such systems with some aspects of the present invention as set forth in the remainder of the present application with reference to the drawings.

SUMMARY OF THE DISCLOSURE

A method, apparatus and system for authenticating HDMI ports is disclosed. In one embodiment, an active port facilitating secure communication of media content between a transmitting device and a receiving device is identified, while the foreground input port of the receivers associated with a first (main) High-bandwidth Digital Content Protection (HDCP) engine (120). Then, background input ports of the receiver are identified as associated with a second (roving) HDCP engine (104, 106, and 108). Stream resynchronization of a port to maintain authentication is performed by various techniques disclosed herein.

Authentication is a key element for content protection. This invention makes the authentication fast and reliable by hiding the authentication in the background, keeping the authentication, and retaining the otherwise lost authentication. The embodiments in this invention reduce the link down time, complexity, and power consumption of the operation significantly, as well as reducing the 'visual' link down time and power consumption.

The drawings show exemplary HDMI circuits and configurations. Variations of these circuits, for example, changing the positions of, adding, or removing certain elements from the circuits are not beyond the scope of the present invention. The illustrated HDMI circuits, systems, configurations, and complementary devices are intended to be complementary to the support found in the detailed description.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

For a fuller understanding of the nature and advantages of the present invention, reference is made to the following detailed description of preferred embodiments and in connection with the accompanying drawings, in which.

DETAILED DESCRIPTION

Figure 1:
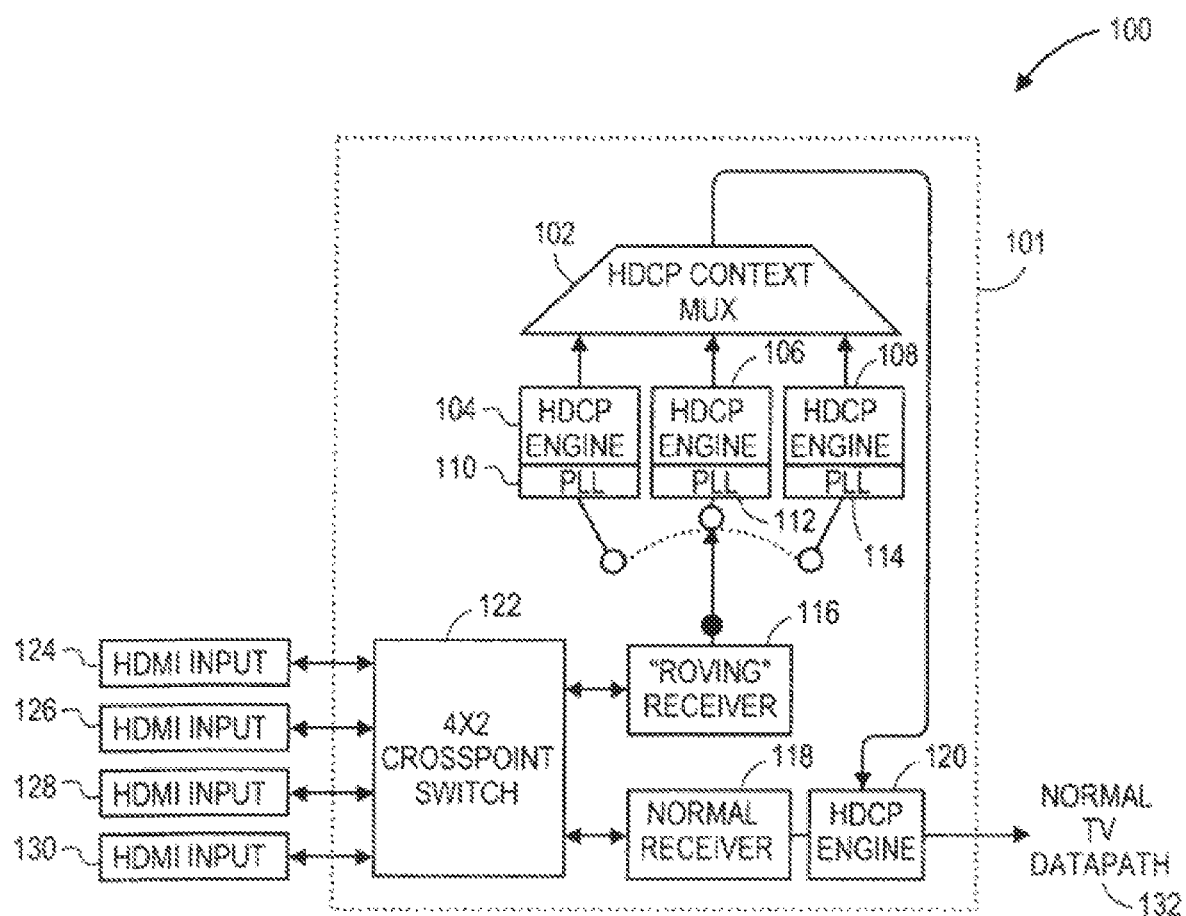
FIG. 1 illustrates a logical block diagram of an HDCP pre-authentication system, in accordance with some embodiments of the disclosure provided herein.

The present disclosure relates to HDMI authentication and content protection. More specifically, this disclosure describes apparatuses, methods and systems providing fast, reliable pairing between HDMI Source and Sink by hiding the authentication, keeping the authentication, and retaining the otherwise lost authentication. The inventors of the present disclosure contemplate a new idea that works to find the correct cipher key that results in proper A/V decoding instead of forcing an HDCP authentication restart.

The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Other objects, advantages and novel features of the disclosure are set forth in the proceeding in view of the drawings where applicable.

Embodiments of the invention are generally directed to pre-authentication and keep-authentication of content-protected ports in a system without having to regenerate the authentication sequence from a Source. The inventors of the present disclosure have recognized the shortcomings of previous solution in the art. Specifically, the original InstaPort always pulsed HPD when HDCP failure is detected at the RX, forcing the Source to re-authenticate. That failure happened every time when the Source uses AV_Mute or in VRR mode. VRR or Variable Refresh Mode is a mode when the video frame rate changes dynamically, therefore it is impossible to know the time duration of the frame in advance.

An object is to try to find a new cipher key that results in proper A/V decoding instead of forcing HDCP re-authentication (by pulsing HPD).

The advantage of the new approach saves on re-authentication time (which may be up to a few seconds) and improves reliability, as each re-authentication may result in a failure. Additionally, the source may apply AV_Mute all the time, which would make the original InstaPort not work in this case.

Other advantages include; that the present disclosure works with VRR and AV_Mute; no need to imitated Pseudo VSYNC (for HDCP 2); and possible power saving as the roving ports may be served more infrequently.

As previously stated, HDMI is an Audio/Video interface standard for transmitting uncompressed (or visually lossless compressed) video data and compressed/uncompressed audio data. The HDMI Source encrypts AV data and the HDMI Sink decrypts the data. The Source transmits a special preamble ENC_EN for each encrypted frame after successful authentication. The Sink decrypts the frames which have ENC_EN active. If Sink misses any ENC_EN signals, then Sink can no longer decrypt AV data properly transmitted by Source, resulting in noise on the display. To recover the system, the Source will re-authenticate based on Sink's request (for HDCP 2.x) or check integrity by itself (for HDCP 1.x). To not miss ENC_EN signals, the Sink should receive AV transmitted by the Source correctly, which requires its Phys and Rx-controller to be active all the time. As the number of ports increase, the number of Phys and Rx-controllers will increase equally for a typical Sink device.

As used herein, "network" or "communication network" means an interconnection network to deliver digital media content (including music, audio/video, gaming, photos, and others) between devices using any number of technologies, such as SATA, Frame Information Structure (FIS), etc. An entertainment network may include a personal entertainment network, such as a network in a household, a network in a business setting, or any other network of devices and/or components. A network includes a Local Area Network (LAN), Wide Area Network (WAN), Metropolitan Area Network (MAN), intranet, the Internet, etc. In a network, certain network devices may be a source of media content, such as a digital television tuner, cable set-top box, handheld device (e.g., personal device assistant (PDA)), video storage server, and other source devices.

Other devices may display or use media content, such as a digital television, home theater system, audio system, gaming system, and other devices. Further, certain devices may be intended to store or transfer media content, such as video and audio storage servers. Certain devices may perform multiple media functions, such as a cable set-top box can serve as a receiver (receiving information from a cable head-end) as well as a transmitter (transmitting information to a TV) and vice versa. In some embodiments, the network devices may be co-located on a single local area network. In other embodiments, the network devices may span multiple network segments, such as through tunneling between local area networks. A network may also include multiple data encoding and encryption processes as well as identify verification processes, such as unique signature verification and unique ID comparison according to one embodiment.

As used herein, "Tx" will be used to generally refer to a transmitting device such as an HDMI transmitting device and "Rx" will be used to generally refer to a receiving device such as an HDMI receiving device. Similarly, this document interchangeably refers to HDMI Source as a device that includes an HDMI transmitter and HDMI Sink as a device that includes an HDMI receiver.

A time-based roving HDCP architecture such as is embodied in this invention uses two AV data pipes: main pipe and roving pipe. The main pipe is dedicated to a port selected by a user to view contents. The roving pipe roves the other HDMI ports (background ports) one by one in a time-based fashion, keeping those ports authenticated and synchronized with the corresponding Txs. One implementation allows four HDMI input ports of a television to be supported with two pipes, for example.

A main pipe in a time-based roving HDCP architecture is a pipe dedicated to the port that a user selects to view content (such as movie). The main pipe, in general, is composed of analog PLL, SerDes (a term that stands for Serializer and Deserializer, in this context, it primarily means Deserializer) and other logics to recover the AV data from the incoming bit stream.

A roving pipe is the pipe that sequentially roves through the ports that are not connected to the main pipe. The components of the roving pipe may be the same as those of the main pipe or significantly simplified just to perform only the necessary functions for the roving operation.

An HDCP engine includes a logic block that encrypts or decrypts the media contents. Tx has an encryption engine, while Rx has a decryption engine. Additionally, the HDCP engine takes care of authentication to establish a secure link between Tx and Rx, and subsequently keeping track of synchronization between Tx and Rx over the secure link to confirm authentication is maintained. The encryption key is periodically changed. With HDCP 1.x, to check the key synchronization, Tx reads the special Ri' value from the Rx approximately every 128 frames and compares it with its expected Ri value. The Ri value is a value derived from the encryption key. With HDCP 2.x, it is the Rx that confirms link synchronization by checking that there are no errors in the BCH parity of received data island packets.

An ENC_EN signal is an indicator whether the following frame is encrypted or not. Tx sends an ENC_EN for each frame it has encrypted to let Rx know that it is an encrypted frame. For purposes of this application, ENC_EN shall be interpreted to mean any encryption synchronization signal including, but not limited to, an ENC_EN signal.

An HDCP signal over HDMI may include the following: VS (Vertical Sync) and ENC_EN (encryption indicator) are in the incoming AV stream for synchronization, while authentication and Ri checking are performed through an I$^2$C (DDC) bus. Note that Ri checking is a mechanism that HDCP 1.x uses for its authentication integrity check. HDCP 2.x authentication integrity check is performed by the HDMI Sink and does not involve DDC. Once the HDMI Sink detects that the authentication integrity is broken, the Sink may request re-authentication, and that may involve DDC.

In one embodiment, a technique of pre-authentication of content-protected ports is employed to, for example, eliminate the need to reauthenticate a media content port each time it is swapped with another port for communicating media content including protected media content. Authentications happens for each port but they are hidden to the user in this invention. Or HDMI Source does not recognize that its output is not being rendered due to the operation of the roving pipe and the authentication between the Source and Sink are kept. In the event that the stream synchronization is lost, this invention allows the Sink regain stream synchronization in order to maintain the authenticated state, eliminating the need for time consuming re-authentication.

In content protection schemes, various tools (e.g., revocation lists) are used to detect, verify, and authenticate devices that communicate with each other. These devices include media devices, such a digital versatile disk or digital video disk (DVD) player, compact disk (CD) players, TVs, computers, etc. For example, a transmitting device (e.g., a DVD player) can use such tools to authenticate a receiving device (e.g., TV) to determine whether the receiving device is legitimate or eligible to receive premium protected media content from the transmitting device. To avoid too many of such authentication processes (that can be cumbersome, time consuming, energy consuming, resource wasting, and that hurts the user experience), pre-authentication of devices is performed.

"Pre-Authentication" is a term used here to indicate a feature of devices, including HDMI switch products, to allow them to switch more quickly between input ports. The term describes the performance of necessary HDCP authentication before switching to the input, instead of after switching to the input. In this way, the significant delays associated with authentication may be hidden in the background of operation, instead of the foreground at the time when the user is expecting to view content.

Link integrity check in HDCP 1.x is performed by the Source. The Source periodically reads Ri' form The Sink and compares it with its expected Ri value. If the values do not match, the keys are unsynchronized, the decryption has failed, and authentication is determined to be lost. Since this check is periodic, it may take several seconds after the synchronization failure before the Source detects the problem. This mechanism is also unreliable in cases when the key mismatch happens on a few frames only. There are indirect methods for the Sink to detect the failure. For example, the Sink may detect the problem by checking BCH parity of incoming HDMI data island packets. If the Sink detects a BCH parity mismatch, it may corrupt Ri' on purpose or pulse the Hot Plug Detect pin. With HDCP 2.x, the Source does not perform the Ri check and the link integrity verification depends on Sink detection of a BCH parity mismatch. Embodiments of pre-authentication of media content ports, as described throughout this document, are employed to address such issues and to provide significant value in data stream operations.

In one embodiment, each input (e.g., HDMI input) may have its own HDCP engine that undergoes pre-authentication and then stays synchronized to the source. One of those inputs is selected by the user to watch the content. The remaining inputs are kept enabled for the purpose of establishing and keeping HDCP sessions. If an authentication integrity issue is detected on any of the inputs, the correction to the HDCP decoder may be applied by the Sink. If such issue occurred at the input not selected by the user, the synchronization process is not visible to the user. Later, when the user decides to switch to another input, this can be done quickly as all inputs receiving the encrypted content are already authenticated and synchronized.

With regard to HDCP synchronization, in general, an HDCP receiver stays synchronized with the transmitter in the two following ways: (1) the receiver recognizes where the frame boundaries are; and (2) the receiver recognizes which of these frames contains a signal that indicates that a frame is encrypted (e.g., ENC_EN). Throughout this document, "ENC_EN" is used as an example of encryption indicator without any limitation for the ease of explanation, brevity, and clarity.

In one embodiment, some of the components of a "pre-authentication" system or apparatus, as described in FIG. 1 and subsequent figures, includes: main receiver with Phase Locked Loop (PLL), roving receiver with PLL, HDCP engine associated with main receiver, HDCP engine associated with the roving receiver, stored state per roving port, etc.

In some embodiments, an apparatus contains one dedicated HDCP engine per input port. In general, normal HDCP logic is required in every case, even when the open-loop HDCP engines do not do any decryption. This is because the re-keying functions use the HDCP logic to maximize dispersion.

Each open-loop HDCP engine counts TMDS clock (in TMDS modes) or other time base (in FRL modes) to lock onto the frame rate and provide ongoing information about where the frame boundaries are while running in the open-loop mode.

A single special purpose HDMI receiver is used to sequentially provide the essential information to the open-loop logic. This receiver cycles through the currently unselected inputs, finds the frame boundaries (so that the corresponding HDCP engine can lock on), and also finds the ENC_EN signal when an authentication occurs. This could be a stripped-down version of an HDMI receiver because in essence only need the VSYNC and ENC_EN indicators are required.

A normal TV data path may work in the same manner as conventional switch products. In operation, one of the input ports is selected for the normal data path, the data stream is decoded and decrypted as necessary, and then is routed through the remainder of the appliance. Further, the roving receiver samples the currently unselected ports, one at a time. This employs a state machine or (more likely) a type of microcontroller to control it all.

The initial operation sequence typically follows: (1) the roving receiver is connected to an unselected input port and monitors it for video; (2) the HDCP engine is connected to the port as well. This means that the DDC is connected. It may also mean signaling Hot Plug Detect (HPD), to indicate to the source that it should begin its transmission and HDCP authentication. This may also employ the transfer of EDID information, but this is beyond the scope of this disclosure; (3) when video is stable, the roving receiver provides information to align the HDCP engine with the frame boundaries; (4) the state machine or microcontroller waits some time for the HDCP authentication to begin. If it does, it continues to wait until the authentication completes and the first ENC_EN signal is received; (5) the HDCP engine continues to cycle in an open-loop fashion, counting "frames" using information only from the roving receiver(s).

The DDC stays connected, and the HPD signal continues to indicate that a receiver is connected; and (6) and roving receiver then continues on to the next port, and performs the same operations.

In some embodiments, once the roving receiver has started all ports, it then goes into a service loop, checking each port in sequence as follows: (1) the roving receiver re-connects to each active background port, one at a time. When it does, it checks to make sure video is still present, and that the frame rate has not changed. If there is a change, the state machine or microcontroller forces re-authentication. This includes intentionally "breaking" the Ri sequence, and/or causing a HPD indication, and then going back to the beginning (unconnected) state on this port; (2) if no significant change is detected, then the roving receiver provides frame boundary information to the associated HDCP engine, which re-synchronizes, and authentication is maintained. In some embodiments, if an error/discrepancy is detected, re-authentication is forced; (3) the state machine also checks with the HDCP block to check if there has been any attempt to re-authenticate while in the open-loop state. If there has been, then this is also a cause for re-authentication; (4) checks if incoming HDMI packets are decoded without BCH errors. If errors are found, then the Sink forces re-authentication; (5) checks if incoming HDMI packets are decoded into correct header and body contents. If errors/discrepancies are found, then the Sink forces re-authentication; and (6) otherwise, all is assumed the operation is still authenticated, and the roving receiver moves on to the next port.

The foregoing discussion further includes HDCP context switching that relates to a system and procedure for initializing and then and keeping the open-loop HDCP engines synchronized. In some embodiment, a switch is produced to provide for such operations. The HDCP context includes a great deal of state information. There are three "B" registers and three "K" registers of 28-bits each. There's also 60 bits total in the LFSRs (Linear Feedback Shift Registers), 8 bits in the shuffle network, 7 bits in the Ri counter, 56 bits in the Ks register, and 64 in the Mi register. Therefore, there are estimated to be 363 bits total context bits that somehow need to be transferred to the active (selected) HDCP engine.

In some embodiments, in order to provide an actual switch that operates smoothly (such that there is no "snow noise" on the screen, the Ri sequence is not broken), switching should be done at a frame boundary. This is true both of the HDCP engine that the system is switching "into", and the engine that the system is switching "out of". However, it is very unlikely that both of these will share a frame boundary. In some embodiments, there are two approaches to address this issue: in the first approach a system does not attempt to switch cleanly, or in the second approach a system does not switch the context.

In the first approach, the HDCP engine that is being switched out is allowed to fail, and then is forced to re-authenticate in the background. In the second approach, the entire HDCP engine is switched in/out, and not just the context. In the second approach, this essentially means that there are four identical HDCP engines (for four data paths), each with frame boundary tracking, and each permanently associated with an input port. In this manner, when a given input port is selected, that particular HDCP engines is switched into the data path cleanly.

Regarding the process of pro-active re-authentication, in some embodiments, the open-loop techniques describe herein operate as intelligent "guesses" about what the HDCP state should be. These are likely to be very accurate for relatively short periods of time, but increasingly less accurate as the time intervals stretch. In some embodiments, it is desirable to intentionally force occasional re-authentications on the open-loop channels according to a certain time interval. In this way, the open-loop time frames (and thus the risk of undiscovered problems) can be limited. In some embodiments, the time interval could be set or altered within the system's microcontroller, thus allowing experimentation to discover the best tradeoff. The shorter the interval, the more accurate the open-loop state will be. The longer the interval, the less likely the user will switch to this channel while it is being re-authenticated. Instead of re-authentication, correct encrypted frame counts can be recovered without relying on re-authentication, applicable to every embodiment of this invention.

In some embodiments, intelligent prioritization is employed wherein a roving receiver may use an intelligent algorithm to choose when and for how long it visits each of the encrypted input ports. For example, it can vary the sequence depending on which ports are active or which ports are using HDCP. It can even vary the sequence depending on the user's typical pattern (they might tend to switch in sequence, or ping-pong between two particular input ports, for example). This may be governed by the microcontroller, and thus is can be modified and tailored outside of the silicon product. Some specific mode of operation, e.g. VRR, could require more attention than the other modes and the algorithm could put different weights per each port's operational mode.

In some embodiments, pre-authentication occurs on background HDMI input ports. This allows skipping the HDCP authentication when one of those inputs is selected. A roving pipe sequences background ports in a loop.

For each background non-authenticated port, the following occurs. Initially, each non-active input port has HPD low. Once the roving pipe is connected to a background port whose +5V Power input is high, where HPD was kept low for certain minimum time, the HPD is set to high and the RX waits for the Source to start EDID read and HDCP authentication (the roving pipe is fixed to that port during the authentication). If the authentication does not start, by timeout, the roving pipe switches to a next background port. If the authentication succeeds and the video frame rate is identified, the port is marked as authenticated and the roving pipe switches to a next non-active port.

For each background authenticated port, the following occurs. The roving pipe checks if HDCP decoding is correct. If HDCP errors are detected (i.e. when Data Island's BCH mismatches), the input is marked as non-authenticated and the HPD is pulsed. Then, see the procedure above.

After the authentication, the HDCP 1 cipher periodically generates a new key stream. On every ENC_EN, the cipher is initialized with a new value. Knowing the number of TMDS clocks per video frame or the time duration of a video frame, the frame boundary tracking logic is capable to count the video frames and therefore track the moments when update is expected. This way the logic updates the cipher without decoding the input stream.

However, there is an issue with keeping the track of the update moments. HDCP specification (unfortunately) requires freezing counting the vertical blank intervals when AVMute signal is sent. Also, HDMI 2.1 introduces the VRR feature which makes the frame length variable. Since the port is not decoding the A/V stream all the time, it is possible that the RX continues counting the vertical blank intervals while the TX does not. When this happens, HDCP authentication fails.

In the context of HDCP 1.x, there are two possibilities what happens on the failure. The Source detects the Ri mismatch and restarts HDCP. Alternatively, the Sink detects BCH errors and re-starts HDCP by pulsing HPD. HPD refers to the hot plug detection (HPD) pin. The specifics of the new approach will be discussed later in the disclosure. In the context of HDCP 2.x, where Sink is responsible to govern the authentication integrity, once an authentication failure occurs, the Sink needs to retain synchronization utilizing this invention or issue REAUTH_REQ or re-start HDCP by pulsing HPD, in such a manner as to minimize the noisy screen.

FIG. 1 illustrates a logical block diagram of an HDCP pre-authentication system 100, in accordance with some embodiments of the disclosure provided herein. The illustrated HDCP pre-authentication system 100 includes an HDCP pre-authentication device 101 that include a dedicated HDCP engine block 104-109, 120 per input port. In general, the normal HDCP logic is used in every case, even when the open-loop ciphers do not do any decryption. This is because the re-keying functions use the HDCP logic to maximize dispersion. Further, an open-loop HDCP engine 104-109 is associated with a PLL 110-115 or PLL-like circuit to lock onto the frame rate and provide ongoing information about where the frame boundaries are while running in the open-loop mode.

A single special purpose HDMI receiver 116 (e.g., roving receiver) may be used to sequentially provide the essential information to the open-loop logic. This roving receiver 116 cycles through the currently unselected inputs, finds the frame boundaries (so that the corresponding PLL 110-115 can lock on), and also finds the first ENC_EN signal when an authentication occurs. In some cases, this could be a stripped-down version of a HDMI receiver 116 because in essence, it merely needs the ENC_EN indicators. In an embodiment, a more elaborated HDMI receiver is needed for providing HDMI data island packets for HDCP engine to decipher and check either the BCH parity or the integrity of the HDMI data island packet.

Further, a normal TV data path 132 may work in the same manner as conventional switch products. In operation, one of the input ports can be selected for the normal data path 132, while the data stream is decoded and decrypted (e.g., decipher to take out original audio/video (A/V) data from the incoming encrypted data) as necessary, and then is routed through the remainder of the appliance.

The roving receiver 116 samples the currently background ports, one at a time. This necessitates a state-machine or (possibly) a microcontroller of some kind to control the process. The initial operational sequence typically follows: (1) the roving receiver 116 is connected to a background input port and monitors it for video; (2) the HDCP engine 104-109 is connected to the port as well, which means that the DDC bus is connected (e.g., DDC is regarded as an additional communication channel between Tx and Rx for link synchronization check). It may also mean signaling HPD, to indicate to the Source that it is ready for getting transmission and the HDCP authentication. This may also facilitate the transfer of Extended Display Identification Data (EDID) information, but this is beyond the scope of this disclosure; (3) when video is stable, the roving receiver 116 provides information to align the HDCP engine with the frame boundaries; (4) the state machine or microcontroller waits a time period for the HDCP authentication to begin. If it does, it continues to wait until the authentication completes and the first ENC_EN signal is received; (5) the HDCP block continues to cycle in an open-loop function counting "frames" using either the TMDS clock counts per video frame (for the case of TMDS) or the time duration per video frame (for the case of FRL or any clock embedded video link that is encrypted with HDCP, e.g. DisplayPort). The DDC port stays connected, and the HPD signal continues to indicate that a receiver is connected; (6) the roving receiver 116 then continues on to the next port and performs the same operations. In some embodiments, once the roving receiver 116 has started all ports, it then goes into a service loop, checking each port in sequence. Not all available ports are initialized at once and the service loop usually starts before all available ports are initialized. In one embodiment, a pre-authentication system 100 having a pre-authentication device 101 employing a pre-authentication architecture (as shown in FIGS. 2-5) may reside in a receiver chip (e.g., switch chip) of a receiver, Rx. Such a receiver can be, for example, used in digital televisions for better and efficient reception of media content.

Figure 2:
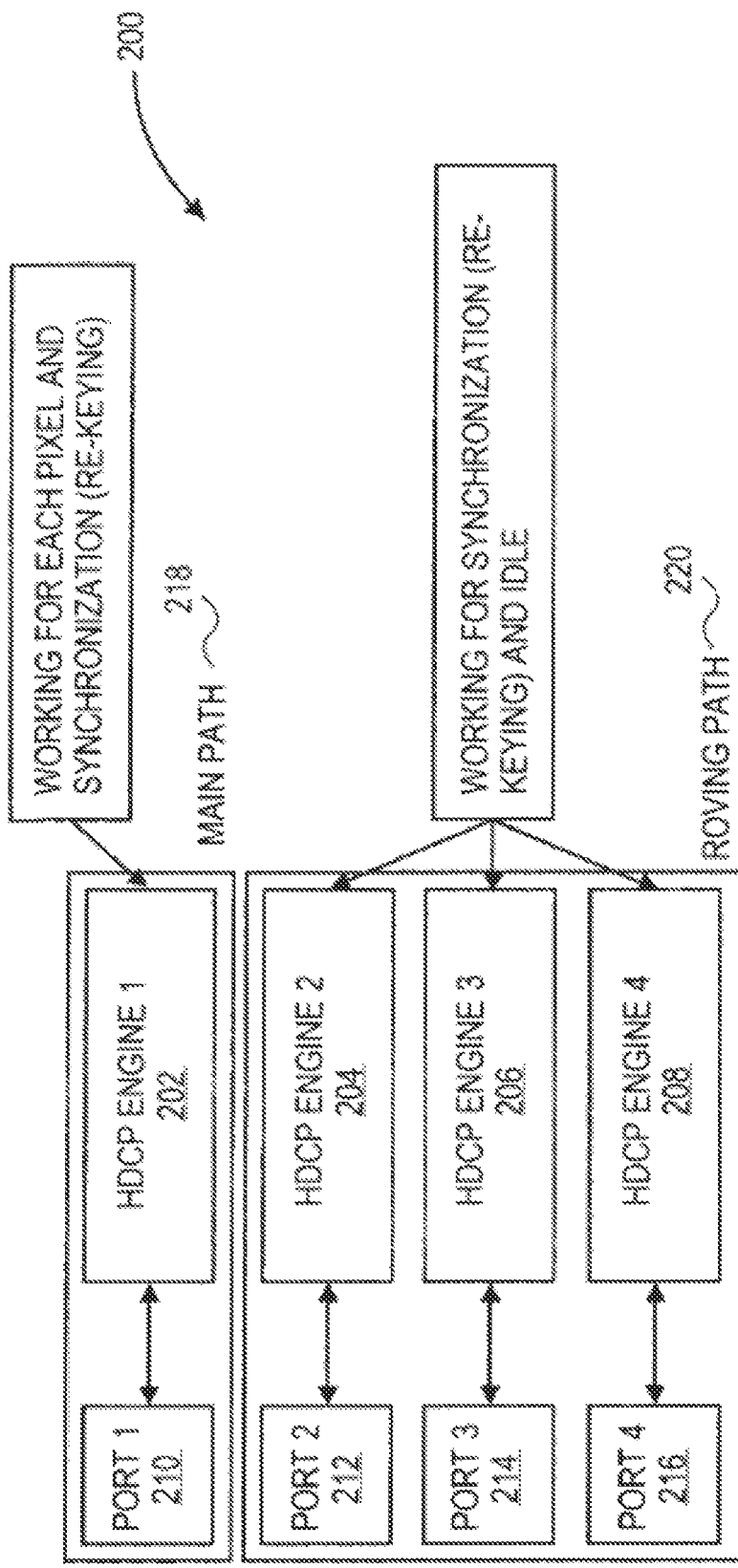
FIG. 2 illustrates an embodiment of an HDCP engine-to-port system employing a one-on-one ratio between the HDCP engines and the corresponding ports, in accordance with one or more embodiments of the disclosure provided herein.

FIG. 2 illustrates an embodiment of an HDCP engine-to-port system 200 employing a one-on-one ratio between the HDCP engines 202-208 and the corresponding ports 210-216, in accordance with one or more embodiments of the disclosure provided herein.

The illustrated system 200 includes four HDCP engines 202-208 that corresponding to ports 210-216 in a one-on-one ratio, e.g., each HDCP engine 202-208 corresponds to a single port 210-216. The system 200 further illustrates port 1 210 as being in main pipe or path 218 and is associated with HDCP engine 1 202. Other paths 2-3 204-206 are in roving pipe or path 220 and are associated with HDCP engines 2-4 204-208.

It is to be noted that the terms pipe and path are used interchangeably throughout this document. HDCP engine 202 of main path 218 works for each pixel (to decrypt and get the video and audio data) and synchronization (e.g., re-keying, which refers to at every frame boundary, Tx and Rx change the shared key used for cipher and decipher the contents. For example, in HDCP 1.x, at the $128^{th}$ frame, Tx and Rx exchange the residue of the key and check the synchronization of the link, called Ri checking in HDCP), while HDCP engines 204-208 of roving path 220 work for synchronization (e.g., re-keying) and idle.

HDCP engines 204-208 of roving path 220 work for a short period of time (e.g., performing the re-keying process) merely to synchronize Ri values that are used to make a transmitter (Tx) trust a receiver (Rx) is synchronized. However, in the system 200 when additional ports are employed, it requires additional corresponding HDCP engines, which can lead to a bigger and more burdensome system. In other words, HDCP engines 204-208 are only needed and are functioning during the synchronization period and the rest of the time period they become idle without any further use for the remainder of the time period while HDCP engine 202 continues to work.

Figure 3:
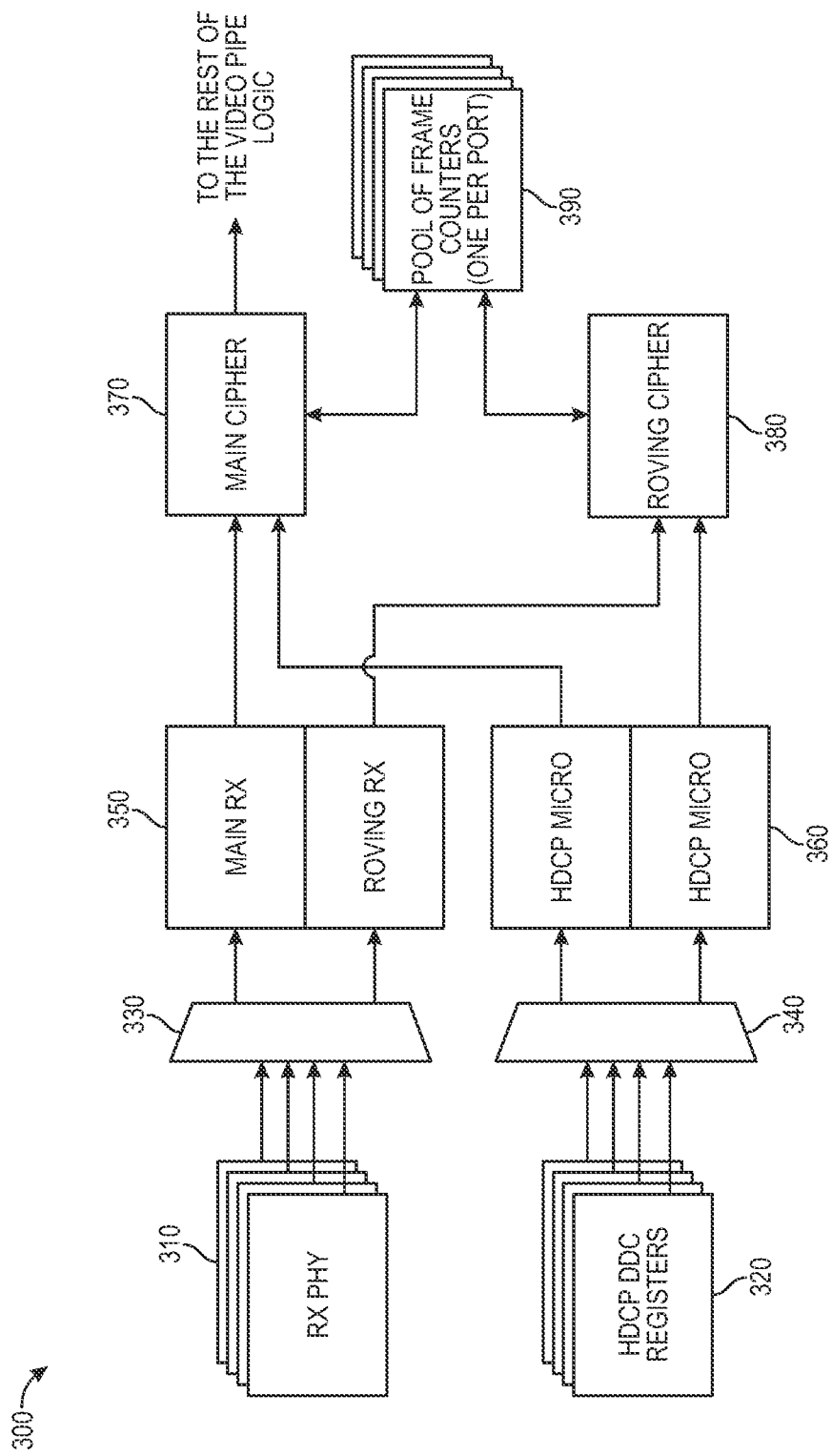
FIG. 3 depicts an exemplary HDCP top block diagram, in accordance with one or more embodiments of the disclosure provided herein.

FIG. 3 depicts an exemplary HDCP top block diagram for HDCP 2.x, in accordance with one or more embodiments of the disclosure provided herein.

As can be appreciated, to keep HDCP authenticated, the TX and RX have to have synchronized FrameNumber counters. The roving pipe checks for HDCP errors. An HDCP error is detected either when the BCH error counters are not zero or the HDMI data island packet shows non-zero integrity errors in the following two scenarios. In TMDS modes, the TERC4 error counters are zero. In FRL mode, the R-S error counters and CED counters are zero.

If the HDCP failure is detected by the roving pipe (which likely mean that the RX counter is ahead of the TX counter) the roving pipe sticks to this port and performs the following. The FrameNumber counter increase for the next frame is skipped (i.e. no increase) and the HDCP errors are re-checked during the next frame. The procedure continues until HDCP errors are gone or N video fields are tried (where N is the number of video fields passed while the roving pipe was away from that particular input). Alternatively, the FrameNumber counter is decreased and HDCP errors are re-checked until the HDCP error disappears or the FrameNumber counter is decreased by N. The earlier embodiment is simpler but the downtime is longer. The latter embodiment is more elaborated and the downtime is shorter. This invention includes various embodiments that facilitate the latter embodiment.

Only if the above procedure failed after the N fields tries, the InstaPort (as the last measure) pulses HPD. This is expected to be an unusual case.

Note that HDCP 2.3 does not have a mechanism allowing the Source to detect the failure (no HDCP 1 Ri check). This allows the Sink to be in total HDCP error detection control and to perform the correction actions at its own pace.

The advantage of the new approach disclosed herein is the following. It saves on re-authentication time (which may be up to a few seconds). An improvement in reliability is expected, as each re-authentication may result in a failure. A source may apply AVMute all the time, which would make the prior arts not working in this case.

In one or more embodiments, it is possible to save a Data Island of a failed frame and re-run HDCP with different FrameNumber without waiting for the next frame. This may improve the re-sync-up time by the time equal up to the time that roving pipe takes for cycling through the ports (as this corresponds to the maximum number of video frames that the RX may erroneously count while the TX is frozen). However, this embodiment may require an extra logic. It is possible to have several ciphers and BCH checkers in parallel. This would result in the same time improvement as demonstrated above.

One HDCP Micro serves the main pipe and another HDCP Micro serves the Roving Pipe. Although theoretically it is possible to have just one Micro to serve both pipes with some arbitration scheme where the main pipe has the highest priority, having two Micros simplifies the design.

Having a Micro per port does not help when there is just one Roving Cipher. In the embodiment that has one authentication engine per each HDMI input port, having a Micro per port could make sense.

Turning to FIG. 3, sink 300 comprises RX phy 310, RX multiplexer 330, HDCP DDC registers 320, HDCP DDC multiplexer 340, main RX 350, Roving RX 355, main cipher 370, HDCP Micro 360, Roving Cipher 380 and Pool of Frame Counters 390.

In operation, there are two Ciphers: Main 370 and Roving 380. Both Ciphers can be identical, however it is also possible to optimize the Roving Cipher where the AES module would run at a lower clock (i.e. not in a real time).

The Main Cipher 370 decodes data from the foreground port (the port the user selected). To do so, it has to count frames (as each frame's key depends on the frame number). This Frame Counter is stored in a Pool 390 outside of the Cipher module where each counter is associated with corresponding input port. Therefore, when a user switches the input, the Main Cipher's counter changes to the newly selected port's one.

The Roving Cipher 380 is sequentially connected to the remaining background inputs in a round robin sequence. The purpose of the Roving Cipher 380 is to keep up to date the background Frame Counters in the pool 390.

Figure 4:
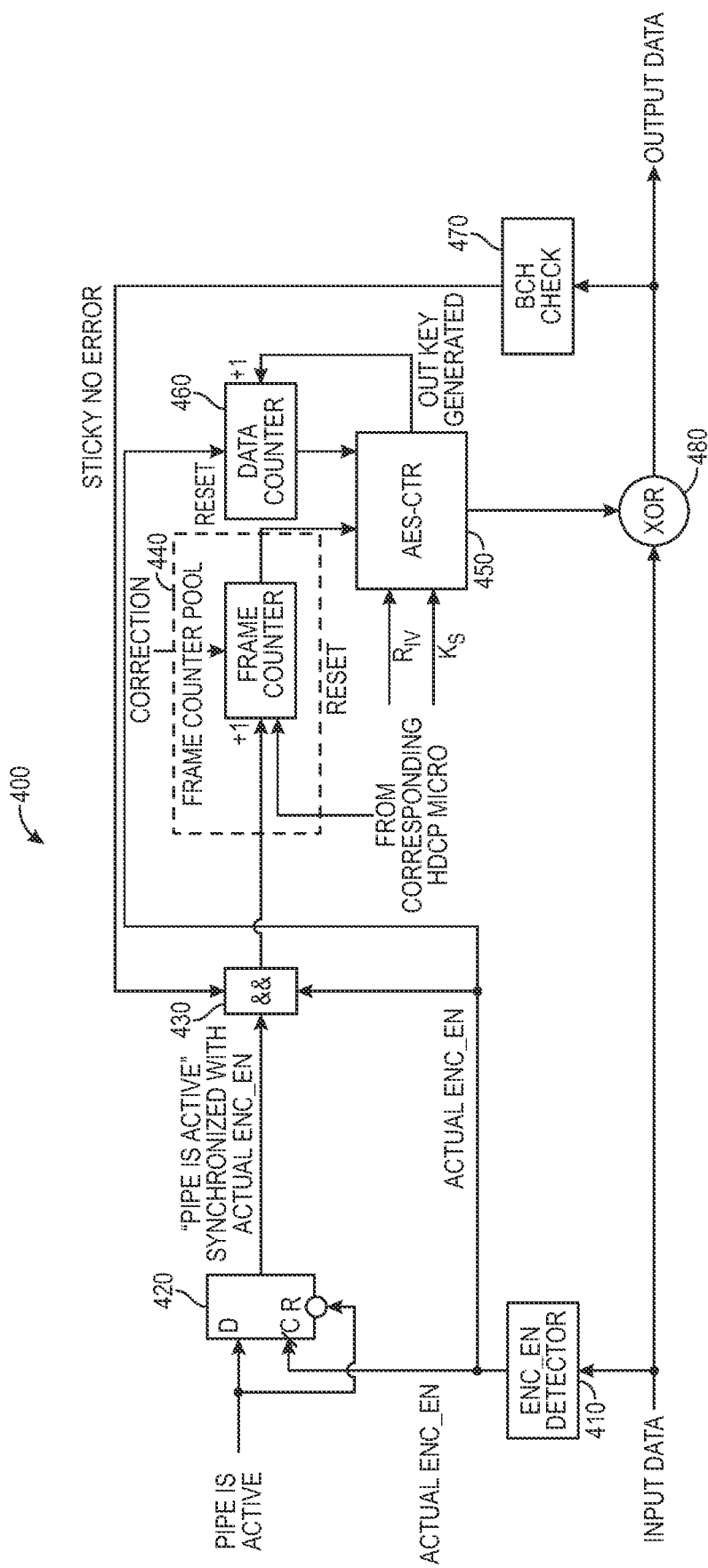
FIG. 4 depicts an exemplary HDCP cypher block diagram, in accordance with one or more embodiments of the disclosure provided herein.

FIG. 4 depicts an exemplary HDCP cypher block diagram, in accordance with one or more embodiments of the disclosure provided herein. Cipher block 400 comprises ENC_EN Detector 410, Sync circuit 420, pipe indicator 415, AND operator 430, Frame Counter Pool 440, Data counter 460, AES-CTR 450, BCH check 460 and XOR operator 480.

Frame Counter Pool 440 comprises, a reset, a correction pathway, and a frame counter in electrical communication with AES-CTR 450. In operation, the frame counter behave as follows. When the pipe is active with no HDCP errors are detected, the frame counter is incremented every $V_{SYNC}$ preceding an encrypted video frame. When pipe indicator 415 show that the pipe is inactive, the frame counter keeps the last value.

When the pipe becomes active after the inactivity period, the counter is first corrected by adding a number N equal to the number of frames lapsed during the inactivity time (i.e., a pre-programmed constant multiplied to a time proportional to the port was inactive either calculated from the counted TMDS clock or from the elapsed time and the frame duration). If the check fails during the next frame, the counter is corrected again by subtracting the same N, then the re-synchronization attempts commences. That is, the counter gets frozen until the BCH errors disappear determined by BCH check 460. Once the first error free packet is received, the counter starts incrementing on every VSYNC.

In one or more embodiments, there is no need to regenerate pseudo-$V_{SYNC}$. For example, in systems prior to HDMI 2.1 without a variable refresh rate (VRR), a re-sync will take one full frame without AV_Mute. If there was an AVMute while the port was inactive, the re-sync needs to look as many frames as the roving port was away from the input minus the AVMute length. With VRR, the re-sync needs to look as many frames as the frames occurred during the inactivity period.

Figure 5:
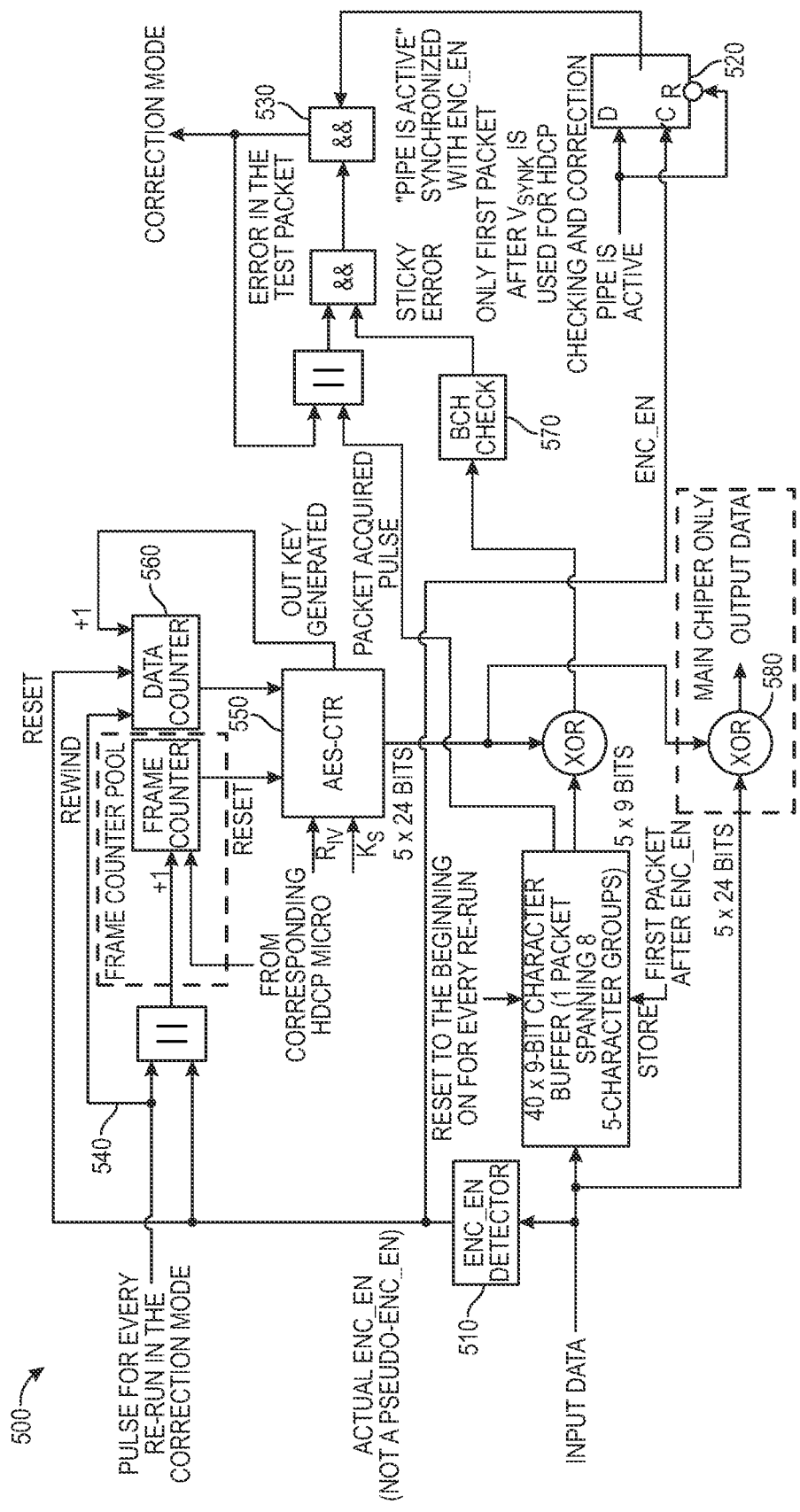
FIG. 5 depicts an exemplary HDCP cypher block diagram, in accordance with other embodiments of the disclosure provided herein.

FIG. 5 depicts an exemplary HDCP cypher block diagram, in accordance with other embodiments of the disclosure provided herein. Cipher block 500 comprises ENC_EN Detector 510, Sync circuit 520, pipe 515, AND operator 530, rewind 540, Data counter 560, AES-CTR 550, BCH check 570 and XOR operator 580. Frame Counter Pool comprises, a reset, a correction pathway, and a frame counter in electrical communication with AES-CTR 550.

The block diagram in FIG. 5 improves over the diagram in FIG. 4 by re-running the same packet with different keys multiple times, which speeds up the key search operations. To be able to re-run the same packet with different keys, the cypher has to rewind 540 the Data Counter 560 corresponding to the packet location on every try. In operation, rewind 540 performs as follows. On every re-run, the Data Counter is decremented to make the counter equal to the value corresponding to the first character of the buffer. Rewind 540 can be just a reset if we assume that the first packet always comes before active video.

In one or more embodiments, a last (or previous) packet is stored. In the case of failure (e.g., BCH errors), the packet is re-run with various Frame Counter values until the errors are gone. This is continued until a successful Frame Counter value is found or timeout (as was the case of 'N' frame search).

It is noted that for the Roving Cipher, everything after the 4×9 buffer and ENC_EN Detector 510 may be run at a lower clock. Meaning, everything after the 4×9 buffer and ENC_EN Detector 510 doesn't need to run in real time. Additionally, only the first packet after $V_{SYNC}$ is typically used for HDCP checking and correction.

In the present embodiments, re-sync occurs within a fraction of a frame, even with VRR. Another advantage is that the present embodiment can be run at lower clock frequencies relative to the main pipe. This also gives rise to more possibilities in complexity.

Figure 6:
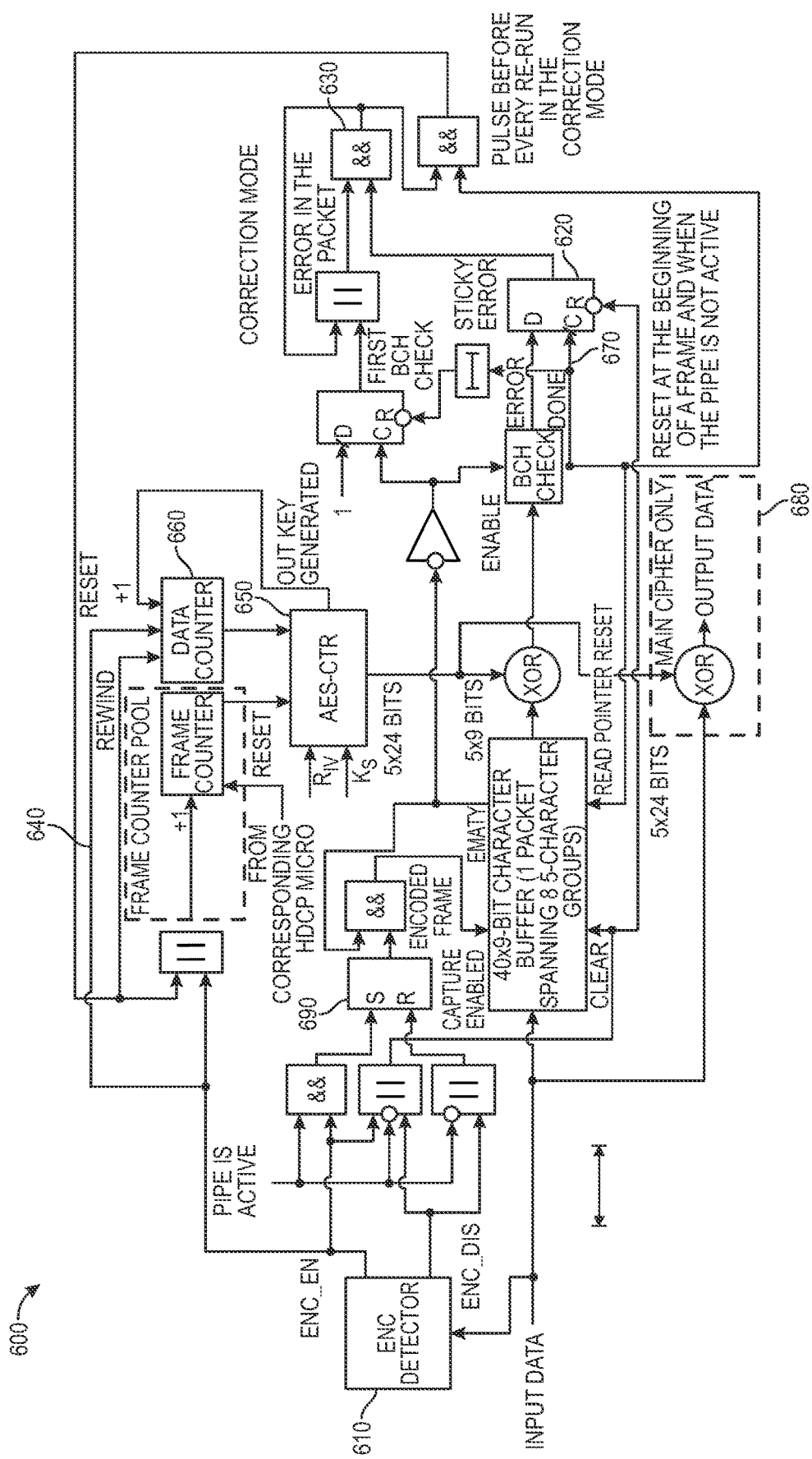
FIG. 6 depicts an exemplary HDCP cypher block diagram, in accordance with one or more embodiments of the disclosure provided herein.

FIG. 6 depicts an exemplary HDCP cypher block diagram, in accordance with one or more embodiments of the disclosure provided herein. Cipher block 600 comprises ENC_EN Detector 610, Sync circuit 620, pipe 615, AND operator 630, rewind 640, Data counter 660, AES-CTR 650, BCH check 670 and XOR operator 680. Frame Counter Pool comprises, a reset, a correction pathway, and a frame counter in electrical communication with AES-CTR 650.

In operation, rewind 640 performs as follows. On every re-run, the Data Counter is decremented to make the counter equal to the value corresponding to the first character of the buffer. Rewind 640 can be just a reset if we assume that the first packet always comes before active video.

In one or more embodiments, a last (or previous) packet is stored. In the case of failure (e.g., BCH errors), the packet is re-run with various Frame Counter values until the errors are gone. This is continued until a successful Frame Counter value is found.

It is noted that for the Roving Cipher, everything after the 4×9 buffer and ENC_EN Detector 610 may be run at a lower clock. Meaning, everything after the 4×9 buffer and ENC_EN Detector 610 doesn't need to run in real time. Additionally, only the first packet after $V_{SYNC}$ is typically used for HDCP checking and correction.

Consistent with the previous embodiment, re-sync occurs within a fraction of a frame, even with VRR. Another advantage is that the present embodiment can be run at lower clock frequencies relative to the roving pipe. This also gives rise to more possibilities in complexity.

Figure 7:
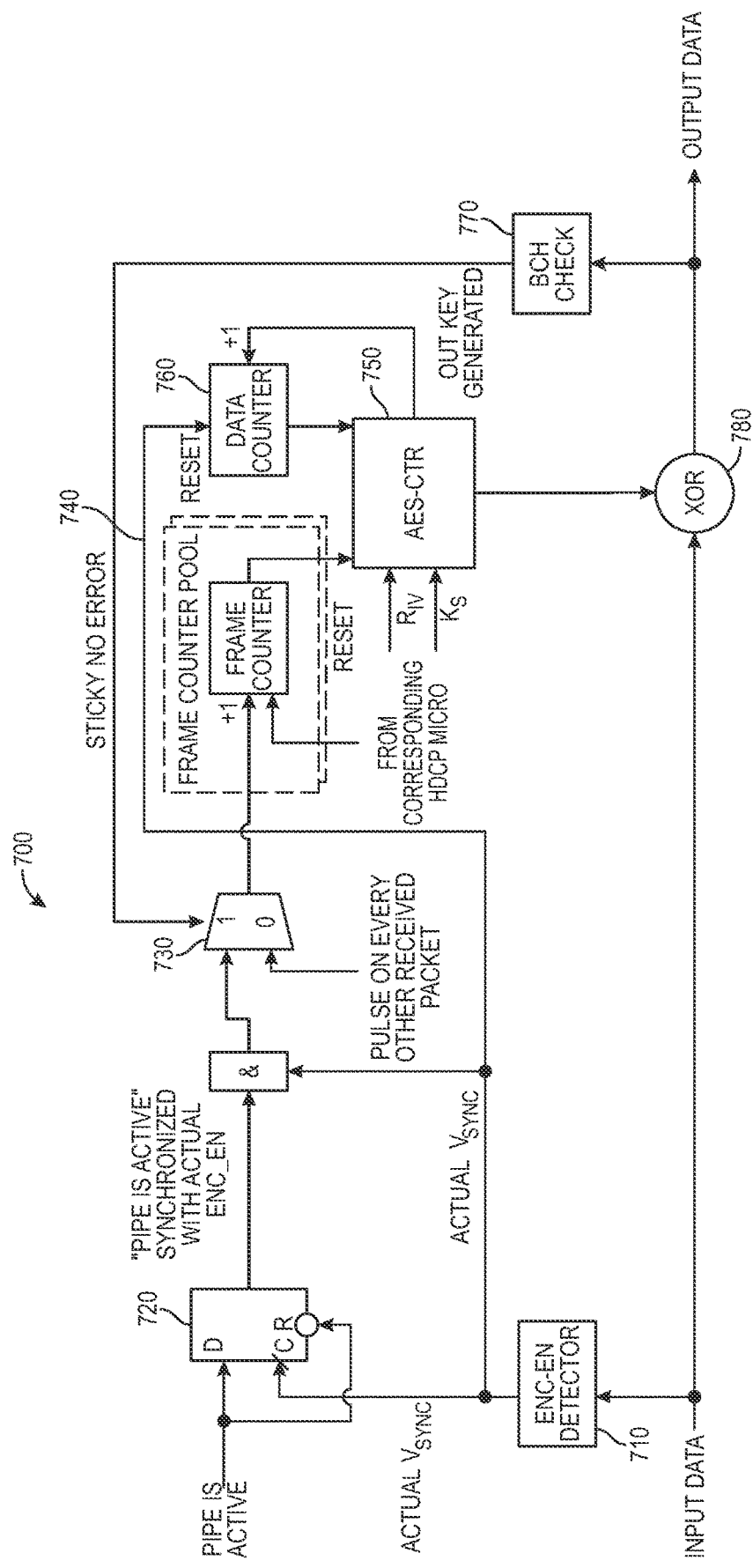
FIG. 7 depicts an exemplary HDCP cypher block diagram, in accordance with other embodiments of the disclosure provided herein.

FIG. 7 depicts an exemplary HDCP cypher block diagram, in accordance with other embodiments of the disclosure provided herein. Cipher block 700 comprises ENC_EN Detector 710, Sync circuit 720, pipe 715, pulse mux 730, Frame Counter Pool 740, Data counter 760, AES-CTR 750, BCH check 770 and XOR operator 780.

Frame Counter Pool 740 comprises, a reset, a correction pathway, and a frame counter in electrical communication with AES-CTR 750. In operation, the frame counter behave as follows. When the pipe is active with no HDCP errors are detected, the frame counter is incremented every $V_{SYNC}$. When pipe is inactive, the frame counter keeps the last value.

When the pipe becomes active after the inactivity period, the frame counter 740 increments on every packet decoding attempt until the first error-free packet is received. The re-try attempts can be done on every other received packet. Attempting to do the retries on every packet may not always work due to the packet may not align to the Data Counter 740 change boundaries and therefore span over different Data Counter values. At which point, the counter starts incrementing on every $V_{SYNC}$ preceding encrypted video frame.

In the present embodiment re-syncs can occur (most likely) within a fraction of a frame, even with VRR. Re-sync speed depends on number of packets in the frame. If the number of packets is twice the number of frames the pipe was inactive, the re-sync is guaranteed to happen within that frame. The re-sync needs as many packets per frame as number of frames the cipher is inactive in one embodiment. In another embodiment, only one packet is examined for BCH parity or Packet Integrity. In such an embodiment, the number of packets does not impact the re-sync time regardless of the number of frames the cipher is inactive.

Figure 8:
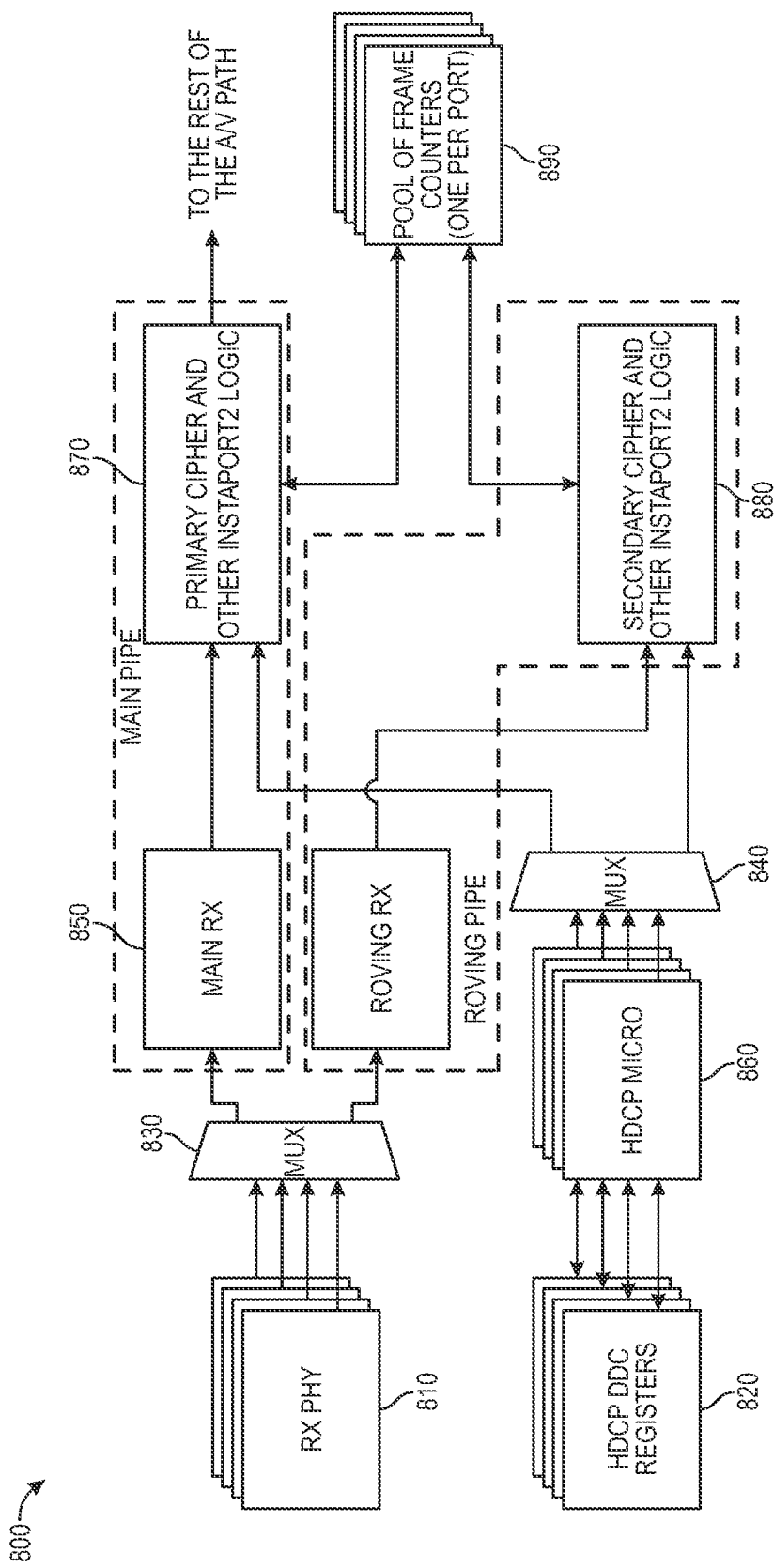
FIG. 8 depicts an exemplary HDCP top block diagram, in accordance with one or more embodiments of the disclosure provided herein.

FIG. 8 depicts an exemplary HDCP top block diagram, in accordance with one or more embodiments of the disclosure provided herein. HDCP receiver 800 comprises Rx PHY 810, DDCP DDC register 820, HDCP MICRO 860, MUX 840, Main Rx, 850, Roving Rx 855, Primary Cipher 870, Frame counters 890, and Secondary Cipher 880.

In practice, an HDCP error occurs when the Source's and the Sink's Frame Counters do not match. The roving pipe periodically checks for HDCP errors on the background ports. An HDCP error is detected when the BCH error counters are not zero and in the following modes, as described. In TMDS mode, the TERC4 error counters are zero. In FRL mode, the R-S error counters (or CED counters) are zero.

As is known in the art, the following definition and explanations are provided. HDMI has two modes: TMDS (the original HDMI method) and FRL (introduced in HDMI 2.1 spec circa 2015). TMDS uses synchronous data transmission, while FRL arranges data in packets.

TERC4 is a physical coding for non-video information sent over HDMI in TMDS mode. TERC4 has redundancy, meaning that some of the codes are not valid. Once the receiver gets a non-valid code, it knows that an error occurred during the transmission.

R-S stands for Reed-Solomon Error Correction. It is also a redundant coding, but it in contrast to TERC, R-S is done at a network (not physical) layer. R-S is only used in FRL mode. It allows error correction and error detection.

CED stands for Character Error Detection. FRL uses so called 16b18b coding method. This means that for every 16 bits of actual data the transmitter creates an 18-bit character, which creates redundancy. When a Sink gets invalid character, it increases the error counter. The error counters can then be read by the Source through a side-channel called DDC.

BCH is a method to calculate and verify parity information (like CRC). In HDMI it is used to check validity of packets transmitted in Data Islands. Data Islands are places during Blanking where the non-video information is transmitted. Blanking pixels are clocks between video pixels transmissions which happen after each video line. The Blanking pixels carry information about some signaling and may include Data Islands.

BCH for the HDMI packets is calculated at the transmitter before the HDCP encryption. Therefore, BCH in Data Island packets may be incorrect either due to transmission errors or when the HDCP decryption fails.

Window of Opportunity is a time window defined in HDCP specification when the transmitter sends ENC_EN/ENC_DIS signals. The ENC_EN and ENC_DIS are sent through HDMI's CTL signaling. CTL is a 4-bit code that is sent during Blanking pixel interval. I.e. during the Blanking interval each Blank "Pixel" carry one of those: CTL, Data Island, or Guard Band (not discussed here).

In contrast to the previous solutions in the art, the present disclosure does not do anything for the ports that are not active (i.e. for the ports that are not connected to either of the pipes). The Sink's counter gets adjusted only when the pipe switches from the inactive to the active state (either background or foreground).

The present disclosure remains compatible with previous solutions in the art. For example, if the present procedure failed after the N fields tries, the system (as the last measure) pulses HPD or send REAUT_REQ. This calls upon the inventors' original InstaPort™. Yet, this is expected to be an unusual case.

Note that HDCP 2.3 does not have a mechanism allowing the Source to detect the failure (no HDCP 1 Part3—Ri check). This allows the Sink to be in total HDCP error detection control (i.e. conceal the errors until it has opportunity to fix them) and perform the correction actions at its own pace.

Turning to FIG. 8, there are two Ciphers: The Primary Cipher (which is a part of the Main pipe) and the Secondary Cipher (which is a part of the Roving Pipe). Both Ciphers can be identical, however it is also possible to optimize the Secondary Cipher where the AES module would run at a lower clock (i.e. not in a real time). More details on the optimization are given in later sections of the present disclosure.

The Primary Cipher decodes data from the Foreground Port (the port selected by the user). To do so, it has to count the video frames (as each frame's key depends on the frame number). This Frame Counter is stored in a Pool of Frame Counters outside of the Cipher module where each counter is associated with corresponding input port. Therefore, when a user switches the input, the Main Cipher's counter changes to the newly selected port's one.

The Secondary Cipher is sequentially connected to the remaining Background Input Ports in a round-robin sequence. The purpose of the Secondary Cipher is to periodically update the background Frame Counters in the pool to keep them not too far from corresponding TX's values.

Each HDCP authentication logic, e.g., HDCP Micro 860 is associated with one Input Port. In the present embodiment HDCP 860 is a microcontroller. Yet, other devices and circuits, such as, field-programmable gate arrays (FPGA), finite state machine (FSM), logic blocks, programmable or otherwise, etc. are not beyond the scope of the present invention.

HDCP Micro 860 allows performing HDCP2 authentication at any port (Active or Inactive) independent of whether it is connected to a Cipher. The result of authentication is the initialization vector (Riv) and the session key (Ks), which are kept in each micro for the corresponding port. Also, after each authentication the Micro resets corresponding Frame Counter associated with the Input Port.

The two MUXes 830, 840 shown in FIG. 8, connect the Foreground Input Port to the Main Pipe. Another microcontroller, called Main Microcontroller (not shown in the figure), monitors the authentication status on all Background Input Ports. For this, the software periodically connects each of the authenticated Background Input Ports to the Roving Pipe.

The HDCP2 synchronization works as follows. For an Inactive Background Port, we do nothing but keep the last used Frame Counter value in the Frame Counter Pool 890. When the port becomes active (i.e. when the Roving Pipe or the Main Pipe gets connected to that input), it triggers the Frame Counter synchronization process.

In HDMI, every encrypted frame starts with the ENC_EN signal. The first packet is captured after ENC_EN and store the unencrypted packet it in a buffer. Then decrypting the packet is attempted using the Frame Counter that was last stored for that input port and check if the decrypted packet's BCH is correct. Most likely it will not be correct because the counter likely to have an outdated value. If the failure is detected (BCH parity does not match), the Frame Counter is incremented and attempted again to run the same packet through the HDCP decoder.

This step is repeated multiple times until the successful Frame Counter value is found or, in case of failure, the number of attempts matches the number of frames we expect passed while the input was inactive. The result is reported to the Main Microcontroller. In the failure case, the Main Microcontroller resets the failed port and pulses HPD (or virtual HPD, if in eARC mode) at the port. This, however, is considered as the last resort and not expected to normal case.

Note that unencrypted video fields cannot be used to synchronize the Frame Counters. The Source may temporarily disable the stream encryption when it sends content that does not require protection. Also, the Source is obligated to disable the encryption when in the AV_Mute state. AV Mute is an HDMI signal that the Source sends when it wants to request the Sink to blank video and mute audio.

This is useful to do when the Source is about to change formats and it notifies the Sink to in advance to avoid artifacts. HDCP specification requires pausing the encryption when the AV Mute signal is active. AV Mute gets activated by Source sending AV Mute Set message and clears after the Source sends AV Mute Clear. Since both messages are packets, if any of them are skipped (which could happen when the input port is not monitored), the Sink AV Mute state may be incorrect. The AV Mute signaling occurs by setting certain bits in GCP (General Control Packet), which is one of the HDMI packets types.

HDCP specification requires the Sinks to ignore ENC_EN signals during the AV_Mute. Since the RX does not receive packets while in not connected to an Input Port, the AV_Mute signaling may be missed. InstaPort2 has a special logic (described in later sections) to detect AV_Mute state without receiving the GCP packet.

Figure 9:
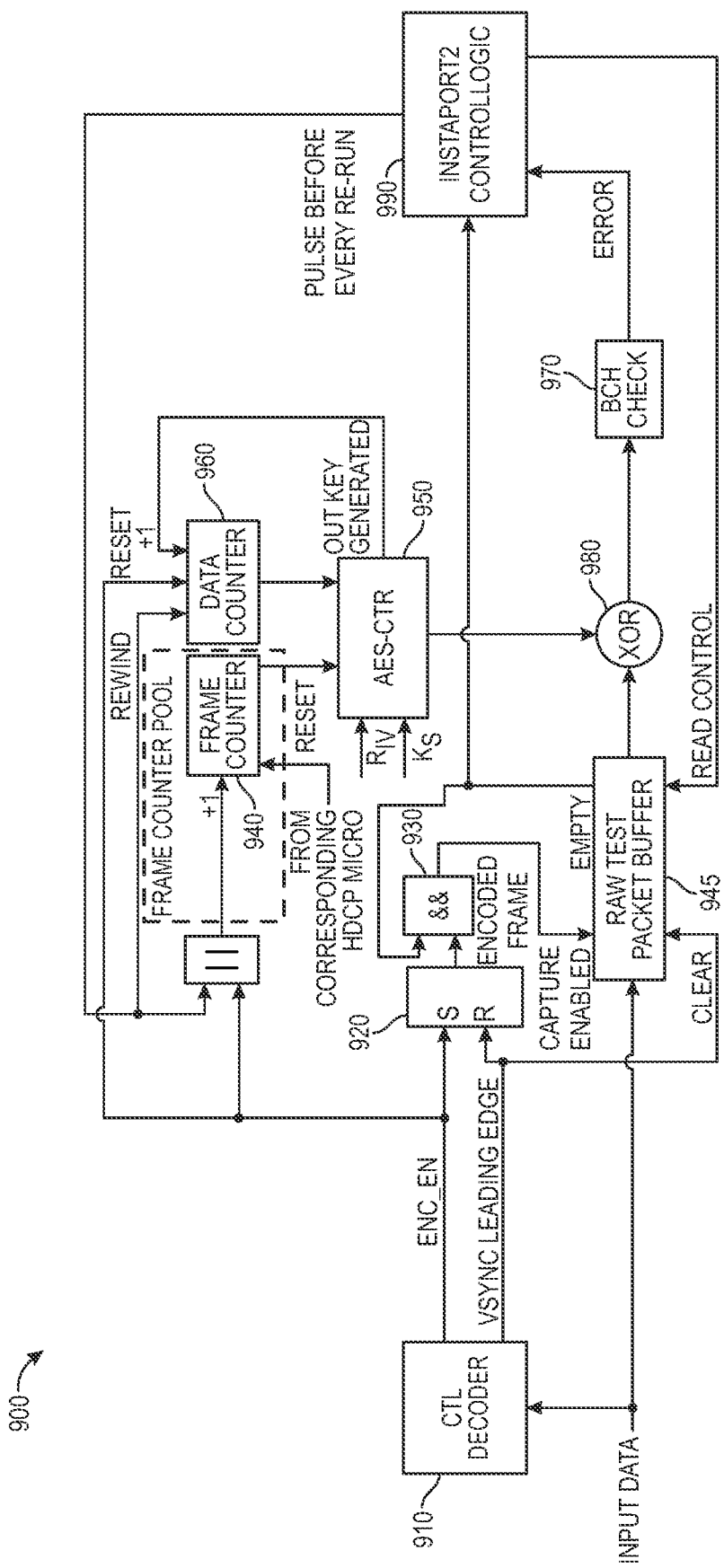
FIG. 9 depicts an exemplary HDCP cypher block diagram, in accordance with one or more embodiments of the disclosure provided herein.

Note that the synchronization described herein relies on reception of an encrypted packet, in some embodiments. If a user switched to a port that at the moment of switching temporary receives unencrypted A/V stream (and therefore all the packets are unencrypted), the HDCP synchronization will not kick on until the Source enables the encryption FIG. 9 depicts an exemplary HDCP cypher block 900 diagram, in accordance with one or more embodiments of the disclosure provided herein. HDCP cypher block 900 comprises CTL decoder 910, Encoded Frame block 920, Packet Buffer 945, XOR 980, BCH check 970, Controller Logic 990, AES-CTR 950, Data Counter 960, and Frame Counter Pool 940.

In some embodiments, Frame Counter Pool 940 is plurality of frame counters, each of the plurality mapped to individual input ports. In one or more embodiments, Data Counter 960 comprises a Rewind pin configured as follows. On every buffer re-run, the Data Counter 960 is decremented to make the counter equal to the value corresponding to the first character of the buffer.

In operation, HDCP2's Frame Counter may become outdated when an input is not connected to the HDCP engine and misses the updates. In practice, HDCP 2 logic searches for a Frame Counter value that produces properly decrypted content.

Each encrypted video field is marked by ending ENC_EN signal during HDCP's Window of Opportunity that occurs fixed number of clocks following the VSYNC leading edge. For progressive (i.e. non-interlaced) formats video field is the same as video frame; for interlaced formats each video frame has two fields—one with odd lines and one with even lines. The present disclosure logic captures first raw packet after ENC_EN and stores it is Raw Test Packet Buffer. If the packet's BCH is correct after HDCP decoding, the Frame Counter is up to date.

If the BCH check fails, the InstaPort2 Control Logic increments the Frame Counter, rewinds the Data Counter back to the value corresponding to the time of the Raw Test Packet reception—because the counter is incremented on each received character—and attempts to decode the packet again. This process repeats until BCH passes or a timeout occurs. If correct BCH is found, the Frame Counter is synchronized and HDCP 2 cipher continues work normally starting with this value. In the case of the timeout, the firmware pulsed HPD (or virtual HPD in the eARC mode), forcing the Source to re-authenticate. More details on the present disclosure's operations are given in the following sections.

Figure 10:
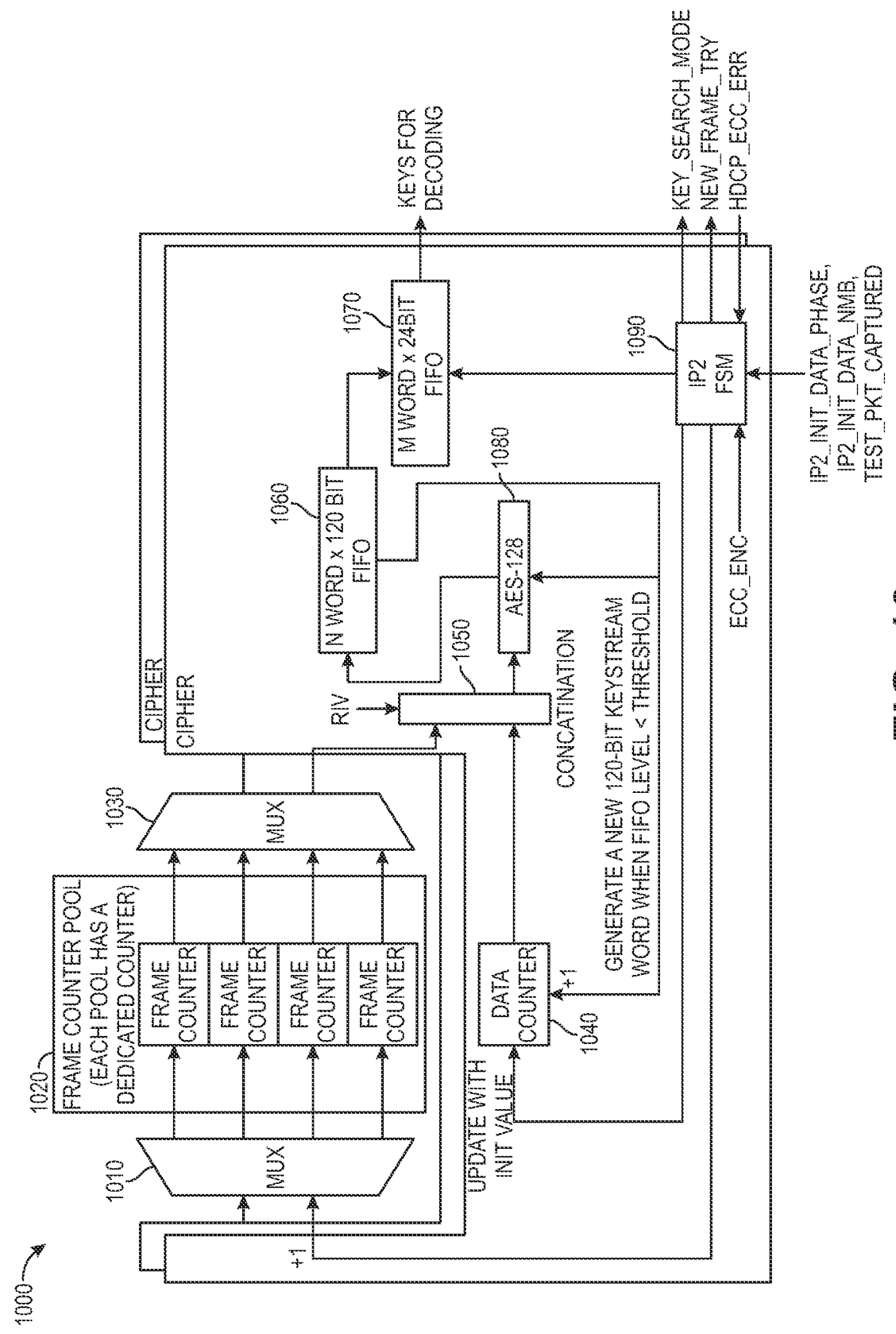
FIG. 10 depicts an exemplary HDCP cypher block diagram, in accordance with other embodiments of the disclosure provided herein.

FIG. 10 depicts an exemplary HDCP cypher block 1000 diagram, in accordance with other embodiments of the disclosure provided herein. FIG. 10 shows some possible implementation details of a portion of FIG. 9. This covers AES-CTL, Frame Counter, Data Counter, and Control Logic.

HDCP cypher block 1000 comprises MUX 1010, MUX 1030, Frame Counter Pool 1020, FIFO 1060, FIFO 1070, Concatenation 1050, Data Counter 1040, and FSM 1090. FIFOs 1060, 1070 are first-in, first-out devices, such as memory, register, or stack. However, any suitable device is not beyond the scope of the present invention.

Two Ciphers are used. One for the Main Pipe and the other for the Roving Pipe. Both Ciphers can be used for a key search. The Main Pipe Cipher also is also used decode the incoming stream. Basically, the decoding is a XOR operation between the input stream and the output of the Cipher.

In contrast to traditional cipher, the Concatenation present embodiment's cipher uses a Frame Counter from the Frame Counter Pool, so each input port has a dedicated counter. That counter can be used in either cipher (Main or Roving). This way the count is preserved if the cipher gets connected to another port and then switches back to the original port. The heart of the cipher is the finite state machine (FSM) 1090, which controls the key search operations and works as described below.

There are two instances of the cipher (Main and Roving). One is connected to the input port selected by the user (called here Foreground Input Port) and called the Primary Cipher (or Main Pipe Cipher). The other, called here as the Secondary Cipher, is part of the Rowing Pipe. This cipher is periodically connected to the remaining input ports that have HDMI's +5V Power signal (called here as Background Input Ports).

Any of the Background Ports may be authenticated at any time independent whether the Secondary Cipher is connected to the port being authenticated or not. The authentication is performed by dedicated HDCP2 authentication logic individual per each input port (in our case implemented by dedicated microcontrollers). After successful authentication, the HDCP microcontroller (in our implementation, but it does not have to be a microcontroller) resets the Frame Counter corresponding to the port. The microcontroller keeps Ks (session key) and Riv (random number used as the initialization vector), which are used by the ciphers (Primary and Secondary) when one of them gets connected to that input port.

The Secondary Cipher, being part of the Roving Pipe, is sequentially connected to the Background Input Ports in a round robin sequence. The purpose of the Secondary Cipher is to monitor and periodically update the Frame Counters in the pool to keep them close to the corresponding TX's values. The monitoring is based on checking the BCH ECC of the incoming HDMI packets and it verifies the decoded packets' ECC). If the error is detected in FRL mode, this is most certainly caused by an HDCP decryption error. If the error is detected in TMDS mode, it can be due to HDCP errors or due to transmission errors. To filter out possible occasional transmission errors, the firmware needs to choose a high BCH threshold of 3 or 4 correctable errors per packet (the maximum number is 5 as there are 5 BCH sub-groups in the packet, minus 1 or 2 for unlikely case of BCH error resulting with a valid BCH syndrome).

Figure 11:
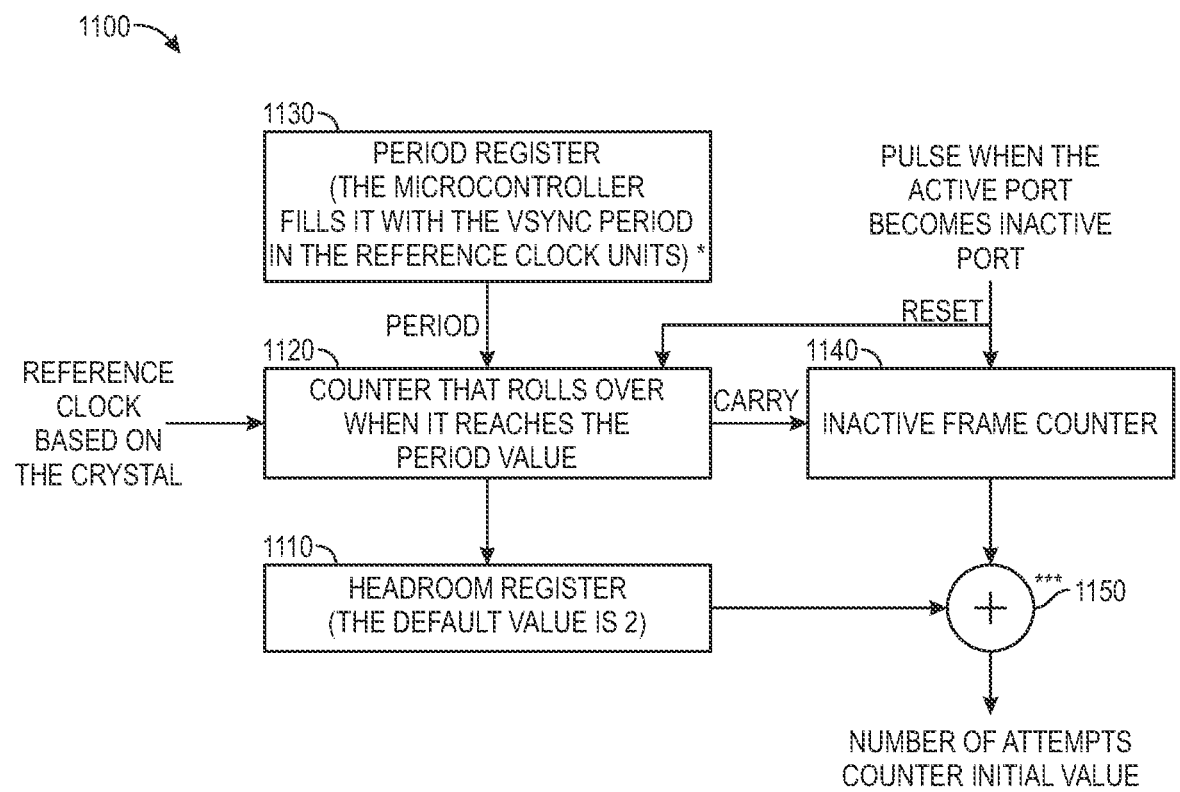
FIG. 11 depicts an exemplary process calculating initial values, in accordance with one or more embodiments of the disclosure provided herein.

The cipher's FSM 1090 works as follows. FSM 1090 waits for an HDCP packet (test_pkt_captured) captured during an encrypted video field (i.e. the field followed ENC_EN signal). FSM 1090 then sets the Number of Attempts Counter to a value that corresponds to the number of VSYNC pulses happened at the input port since it was last connected to a cipher. The Number of Attempts Counter value must be no less than the expected number of the VSYNC pulses. FIG. 11 shows how to obtain the initial value based on the firmware input and the reference clock from the crystal.

The FSM 1090 stores ip2_init_data_nmb and ip2_init_data_phase signals corresponding to the beginning of the packet. These signals represent the AES output code count and the phase correspondingly. Each AES code is 120 bits wide. Every time the AES module generates a new code, the ip2_init_data_nmb increments. Since HDMI's characters are 24 bits wide, each 120-bit code is applied to 5 sequential 24-bit characters. ip2_init_data_phase represents the number of the 24-bit HDMI character word in the 120-bit AES word.

FIG. 11 depicts an exemplary process 1100 calculating initial values, in accordance with one or more embodiments of the disclosure provided herein. Initial values process 1100 comprises Headroom register 1110, Counter 1120, Period register 1130, Inactive Frame Counter 1140, and Adder 1150.

In VRR mode, the period register 1130 should correspond to the shortest VSYNC period. The firmware can program this register to the highest supported refresh rate, i.e., in VRR and non-VRR modes. Also, for practical reasons, Adder 1150 can be replaced by such that the Inactive Frame Counter 1140 can be reset to the Headroom value of the Headroom register 1110.

In operation, FSM checks BCH ECC for the captured packet. In FRL mode (which has reliable transport mechanism) any BCH failure can be considered as HDCP failure. In TMDS mode the failure may be as due to HDCP as due to transmission errors. Therefore, in TMDS mode some additional check may be performed to filter-out non-HDCP failures. This can be done by ignoring BCH results for packets with TERC4 errors. Another option is to have a BCH check threshold. Each HDCP packet has 5 BCH blocks. The threshold can be set to, for example, 3. I.e. if less than 3 blocks fail, this could be assumed as a transmission error and such packet can be ignored for the purposes of the present embodiment.

If the FSM determined that there is HDCP2 failure, it resets the FIFOs as shown in FIG. 10 and enters the search mode. The FSM runs the cipher until the N-word 120-bit FIFO is filled up to the watermark. Each AES generation cycle occurs with sequential Data Counter values concatenated with the Frame Counter and Riv. The captured packet gets decoded and checked for HDCP errors. If errors are found, the FSM increments the Frame counter, sets the Data Counter with the ip2_init_data_nmb, generates the new AES output and checks the packet BCH again. This process repeats until the search is finished with the Frame Counter value or ends by timeout.

In addition to the modification shown in FIG. 10, the secondary cipher (the one for the roving pipe) may be simplified. Note that the output of the secondary cipher is not used for anything but checking the decrypted packet's ECC. Since the secondary cipher does not have to work in real time, it may run at a slower clock.

In HDCP 2, the Sink is responsible for checking whether the incoming stream is properly decoded. This allows InstaPort2 (which is a part of a Sink) to be fully in control of the situation. Whereas, in HDCP 1, the Sink reports to the Source Ri' ("Ri prime") that is devised based on the HDCP decoder state. The Source periodically reads this value and compares it with its own Ri (not prime). If the values do not match, the Source considers that the authentication is lost and re-starts authentication. As can be seen from the above, the failure decision is by the Source. This creates challenges for InstaPort2. The Sink has to generate the correct Ri' before the Source reads it.

HDCP 2 cipher uses Frame Counter and Data Counter to derive a stream key for a particular character. The counters are easy to modify in either direction by an arbitrary number to generate the key for a particular place in the stream. In contrast, HDCP 1 derives a new frame key based on the previous frame state. It is practically impossible to calculate a previous frame key knowing the current frame state. Similarly, a key for a particular character of a frame is done based on a cipher state for the previous character. To find a key for a particular character, the cipher has to advance through all previous characters of the frame.

Another challenge is separation of the authentication logic from the cipher logic. HDCP 2 authentication and cipher logic are clearly separated. In contrast, HDCP 1's authentication and the stream decoding logic are not that clearly separated. It is noted that HDCP 1 is only allowed in TMDS mode, which is limited to 340 MHz TMDS rate.

Figure 12:
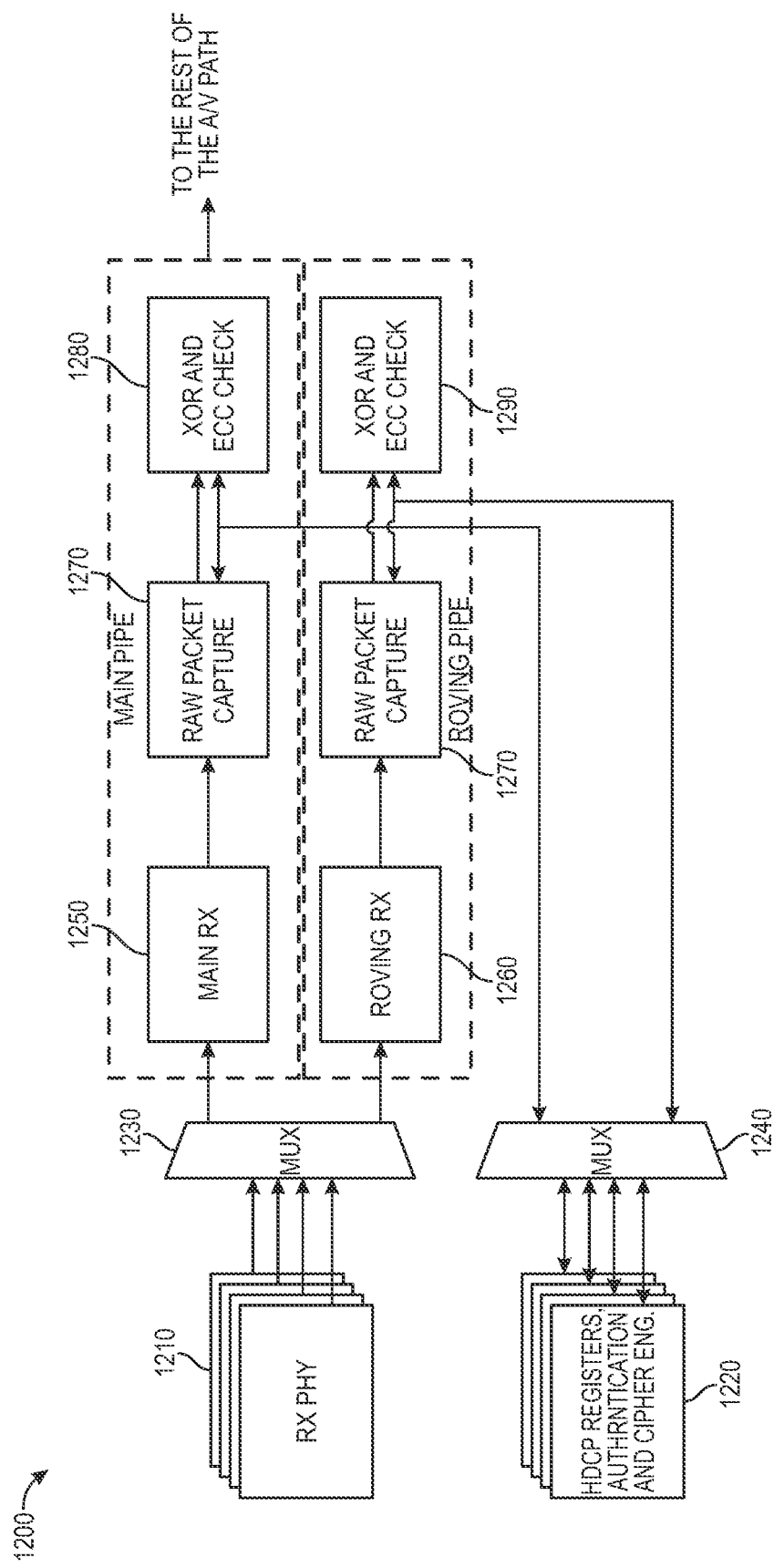
FIG. 12 depicts an exemplary HDCP top block diagram, in accordance with one or more embodiments of the disclosure provided herein.

FIG. 12 depicts an exemplary HDCP top block diagram, in accordance with one or more embodiments of the disclosure provided herein. HDCP block 1200 comprises Rx PHY 1210, HDCP registers 1220, MUX 1230, MUX 1240 main pipe and roving pipe. Main pipe comprises Main Rx 1250, Raw packet capture 1270, and XOR and ECC check 1280. Roving pipe comprises Roving Rx 1260, Raw packet capture 1270, and XOR and ECC check 1290.

In contrast to present disclosure's application to HDCP 2, HDCP 1 has as many authentication/cipher modules as it has inputs. It is simpler to instantiate small (relatively to HDCP 2) modules than introduce a complex mechanism of sharing. Also, since Ri updates have to be done at exact points of time, sharing may introduce additional arbitration difficulties.

Each Input Port has a dedicated authentication/cipher module which runs hdcpBlockCipher on every ENC_EN (if the cipher is connected to the input) or pseudo-ENC_EN generated by the InstaPort2™ logic. The roving engine periodically connects the Roving Pipe to every Background Input Port with the +5V Power signal to verify if the keystreams of the receiver and the transmitter are synchronized. The check is done by verifying the BCH ECC errors of the decrypted packets.

In case if a mismatch is detected, the key search procedure starts. In the search mode, the pipe (Main or Roving) captures the first encrypted packet after ECC_EN and runs this packet through the HDCP decryption procedure with various keystreams corresponding to previous video fields.

The common HDCP un-synchronization happens when the Source temporary stops encrypting video fields (e.g., some video fields may be not encrypted), but the Sink is not aware about this and updates the HDCP cypher at every VSYNC. The InstaPort2 assumes that in case of un-synchronization the Sink is always ahead of the Source in the ENC_EN updates. The difference may be as big as the number of fields that the Sink's cipher has skipped while the cipher was not connected to the input (and received pseudo-ENC_EN instead of the real ENC_EN).

In order to be able to try key for the previous video fields, the InstaPort2™ HDCP 1 cipher has to store Mi values that were used in hdcpBlockCipher for the time while the cipher was disconnected from the Input Port.

As was previously mentioned for present disclosure's application to HDCP 2, the HDCP synchronization can only be done when encoded HDMI packets are received. If a user switches to a port that is temporary unencrypted, the synchronization process will be delayed until the first encrypted packet.

Figure 13:
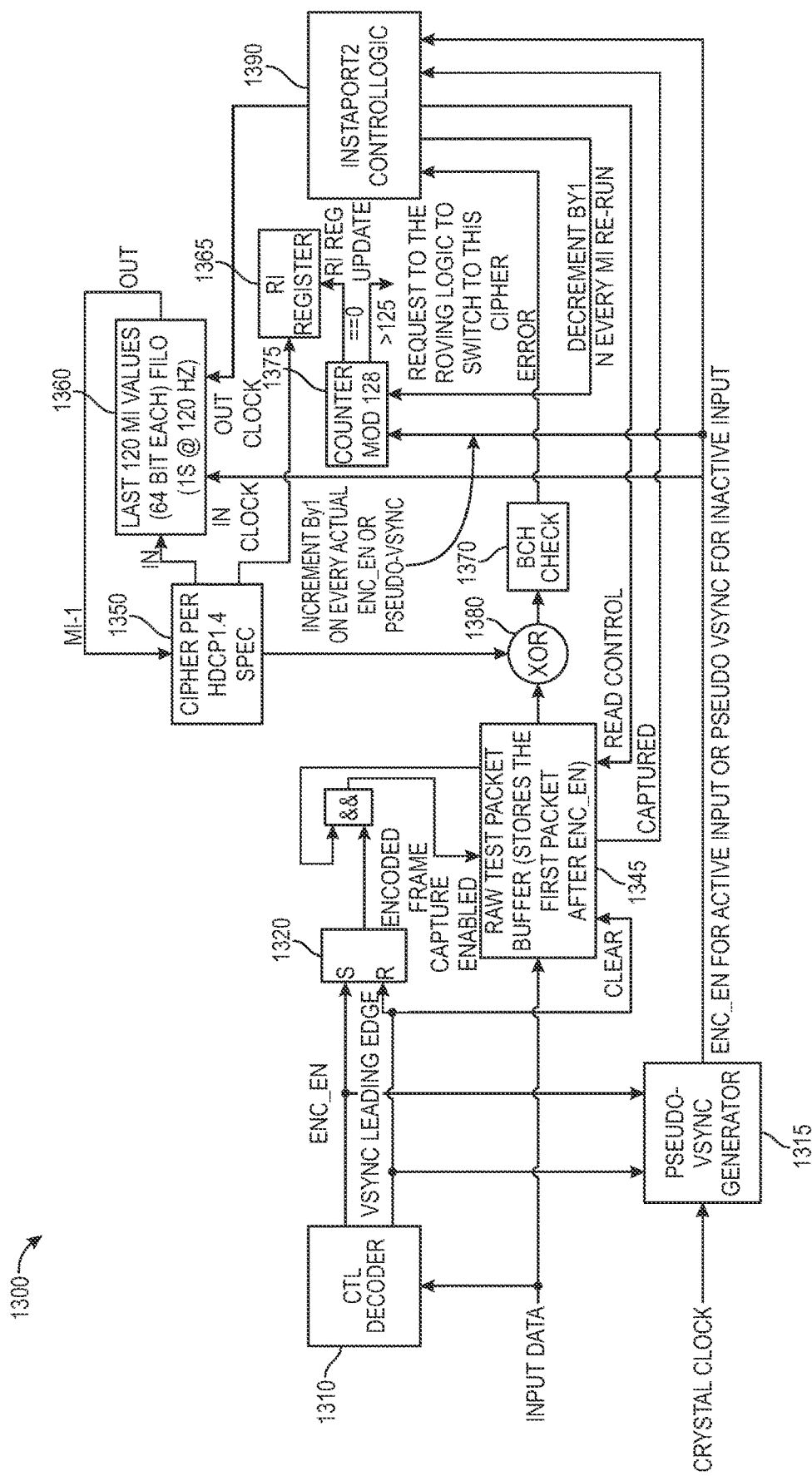
FIG. 13 depicts an exemplary HDCP cypher block diagram, in accordance with one or more embodiments of the disclosure provided herein.

FIG. 13 depicts an exemplary HDCP cypher block 1300 diagram, in accordance with one or more embodiments of the disclosure provided herein. HDCP cypher block 1300 comprises CTL decoder 1310, Pseudo-VSYNC generator 1315, Raw test packet buffer 1345, XOR 1380, BCH 1370, Cipher 1350, FILO buffer 1360, Ri register 1365, and Controller logic 1390.

Each HDCP 1 Input Port has a dedicated HDCP authentication/cipher module. However, the cipher is not always connected to the Input Port (to save power required for the reception and reduce the die size). HDCP 1 has Ri' register that has to be updated every 128 ENC_EN pulses and this register has to be maintained even when the cipher is not connected to the input. Failure to update the Ri' register in time may result in the Source detecting the mismatch and re-starting HDCP. To keep the register up to date, the present embodiment has a module that generates Pseudo-VSYNC when the cipher is not connected to the input port, in some embodiments.

Pseudo-VSYNC matches the actual ENC_EN is the Source encrypts every video field. However, if the Source pauses the encryption (e.g., during the AV_Mute or when sending content that does not require protection), the Pseudo-VSYNC pulses will falsely advance the hdcpBlockCipher, which will cause Source vs Sink keys un-synchronization and affect the Ri' value. To compensate, the present disclosure's logic has a mechanism described below.

The Pseudo-VSYNC Generator 1315 uses crystal clock for the reference and generates Pseudo-VSYNC pulses at the cadence programmed by the microcontroller. The microcontroller is expected to measure the VSYNC period and program the generator accordingly. To match the output pulses phase with the actual VSYNC, the generator must have a reset circuit that would do the adjustments while the Input Port is Active. When connected to an Active Port, the generator outputs actual ENC_EN instead of Pseudo-VSYNC.

The hdcpBlockCipher uses the Mi value calculated for the previous video field as an input to calculate the cipher initial state for the current field. InstaPort2 for HDCP 1 stores previous Mi values, which allows rewinding the cipher state.

A port becomes active when the roving pipe or the main pipe gets connected to that input. This may happen either when the roving engine switches to that background input or when a user selects this new input, which becomes the foreground input. In either case this triggers the Mi synchronization process.

Each encrypted video field is marked by ENC_EN signal. The Controller logic 1390 captures the first raw HDMI packet after ENC_EN and stores it in the Raw Test Packet Buffer. If the packet's BCH is correct after HDCP decoding, the cipher state is up to date and no correction is required. This is expected when the frame rate was matching the Mi update cadence (i.e. no VRR) and no unencrypted video fields were sent while the input was inactive. If the BCH check fails, the Controller Logic 1390 tries the previous video field Mi value and attempts to decode the test packet again.

This process repeats until BCH passes or all Mi values in the FILO ("First Input Last Output", a.k.a. "stack" buffer) are tried or the number of tries exceeds the maximum number of video fields that may occur since the cipher was last connected to the Input Port. If correct BCH is found, the HDCP state is synchronized and HDCP 1 cipher continues work normally starting with this value. In the correct decoding keys are not found after trying all Mi in the FILO, as the last resort, the Sink firmware may pulse HPD, forcing the Source to re-authenticate. Alternatively, the firmware does not have to pulse HPD as the Source will restart after it discovers the Ri mismatch.

As was mentioned above, the Ri' register has to be updated on every 128th ENC_EN (which is slightly more than once per 2 s for 60 Hz video, 1 s for 120 Hz video, or 4 s for 30 Hz video). Note that "i" here is the video field number and the HDCP spec requires hdcpBlockCipher to generate a new Ri for every field. However, the HDCP DDC Ri register is only updated every 128 ENC_EN. In other words, "i" in Ri is updated in 128 increments only. To make sure the Ri DDC register is correctly updated, the InstaPort2 logic generates an interrupt for the microcontroller a few fields before the register is expected to be due for the update (based on Pseudo-VSYNCs). This is at the field #125 in FIG. 13, but should be programmable. The microcontroller connects the cipher to the Input Port and then the Controller logic 1390, if needed, synchronizes the cypher state. If the microcontroller does not serve the request (which could happen if it serves another cipher at this time), the HW updates the DDC Ri register at the estimated time (i.e. 128th Pseudo-VSYNC).

If all HDCP 1 Sources connected to the Input Ports use fixed frame rate (i.e. no VRR), and do not pause the encryption (i.e. no AV_Mute or temporal sending of unencrypted content), the Ri updates will be well estimated. In such case, if the microcontroller does not serve the Ri check interrupts promptly, the InstaPort2 will still work fine with regular periodical switching, which, in this case, mainly adjusts the Pseudo-VSYNC Generator's phase. The Ri check interrupts, though, may be critical for the ports that pause the encryption or vary the video frame length (i.e. in the VRR mode). If the microcontroller serves the cipher with a delay and the Source checks uncorrected Ri, the Source may decide to re-start authentication, which is not desirable.

In the VRR mode, since the refresh rate changes dynamically, the Pseudo-VSYNC generator has to be programmed with a video field value corresponding to the shortest field length for given VRR mode. This way the Ri checks will happen rather quickly than needed and adjusted before the due time for sure. During the synchronization, whenever the InstaPort2 logic tries a previous Mi, the frame counter counting the Pseudo-VSYNC pulses is decremented by 1. This accounts for the "incorrect" "i" increases.

If more than one port requests the Ri check, the microcontroller may not be able to serve all the requests. Therefore, the priority has to be given to the port with VRR as it is more likely that such port requires the synchronization. Due to this, InstaPort2 for HDCP 1 may not reliably synchronize more than one VRR stream.

For clarity, many elements are represented as single blocks, however these are implemented as pluralities in practice. Furthermore, a pulse is generated on every actual ENC_EN, Pseudo-VSYNC, and before every re-run in the search mode.

Figure 14:
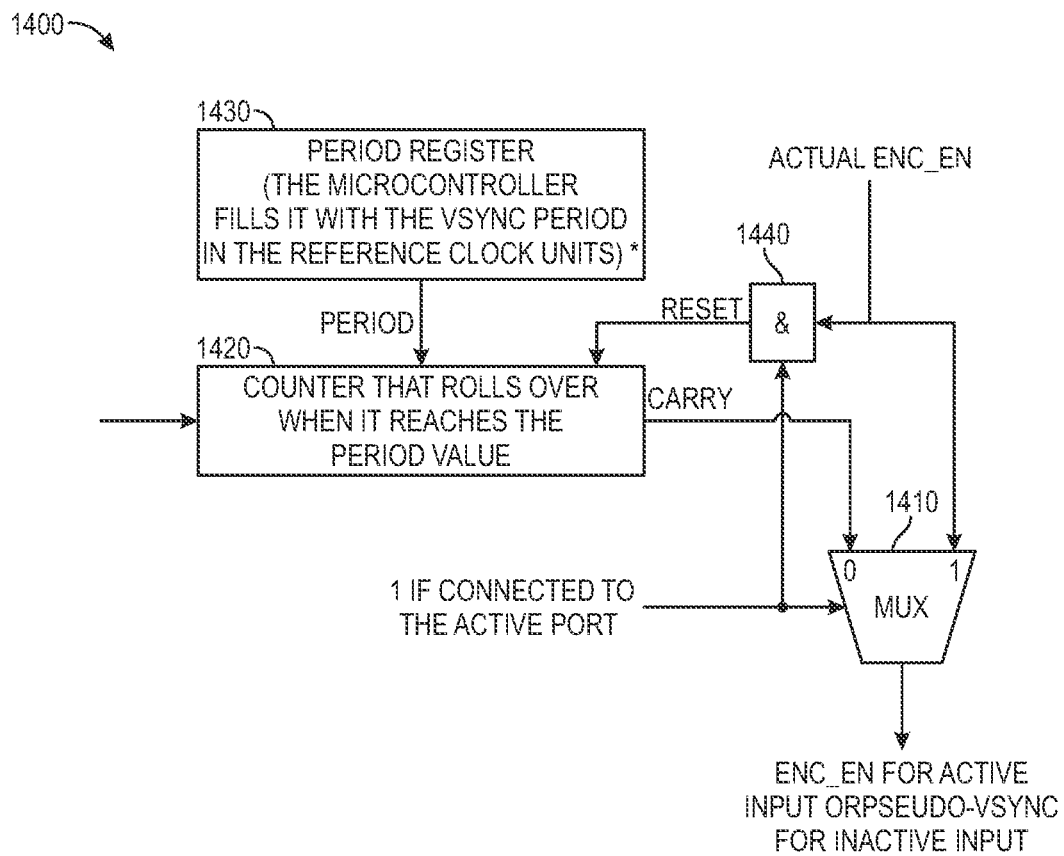
FIG. 14 illustrate a pseudo VSYNC generator, in accordance with other embodiments of the disclosure provided herein.

FIG. 14 illustrate a pseudo VSYNC generator 1400, in accordance with other embodiments of the disclosure provided herein. VSYNC generator 1400 comprises Period register 1430, Counter 1420, MUX 1410 and AND logic 1440.

Each Input Port has a dedicated Pseudo-HSYNC Generator 1400, in some embodiments. The Period Register 1430 value must not exceed the actual video field period. This is needed to make sure that the Sink's HDCP state is never ahead of the Source's one. The incoming video format period may be measured by the HW (the best option) or determined based on the VIC information. VIC is "Video ID Code" that identifies a video format. It is transmitted as an auxiliary information in one of HDMI packets. In the latter case, need to take in account allowed +/−0.5% pixel clock deviation and program the Period Register 1430 conservatively. The more accurately the register is set, the less error will accumulate each video field and, therefore, the rarer the roving pipe needs to connect to the Input Port for the cipher update.

In case of VRR, the Period Register must be set according to the shortest allowed video field period.

Figure 15:
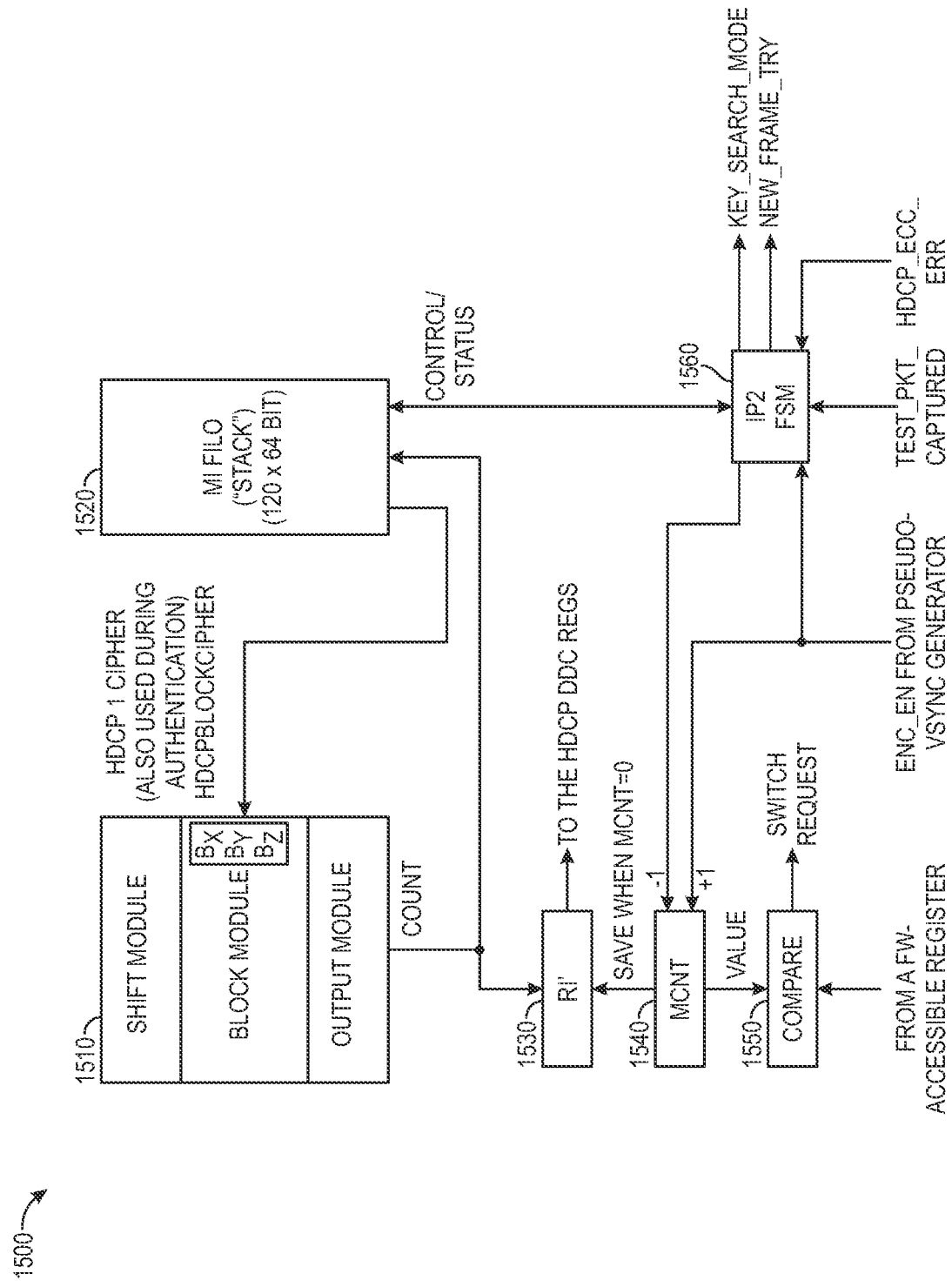
FIG. 15 illustrate depicts exemplary core logic, in accordance with other embodiments of the disclosure provided herein.

FIG. 15 illustrate depicts exemplary core logic 1500, in accordance with other embodiments of the disclosure provided herein. FIG. 15 shows portion of FIG. 13 which includes the HDCP Cipher 1510, FILO 1520, Ri register 1530, Counter mod 128 1540, Comparator 1550, and Control Logic 1560.

Each input port has to have its own logic shown in FIG. 15. The upper left corner of the figure shows the standard HDCP 1 cypher. The traditional Cipher has a single register to keep the secret Mi value. Instead of this, InstaPort2 has Mi FILO. FILO stands for "First In, Last Out" (in contrast to FIFO— "First In, First Out"). It can also be considered as a stack. In normal mode (when Sink's HDCP is synchronized with the Source's one) the Mi value on top of the FILO acts like the traditional Mi register. When the pipe gets disconnected from the input, the cipher continues running hdcpBlockCipher on every Pseudo-VSYNC and stores the mi values in the FILO.

The heart of the cipher is the InstaPort2 FSM (IP2 FSM), which controls the key search operations and works as described below. When hdcp_ecc_err is not asserted (i.e. there are no HDCP errors in the HDMI packets), the IP2 FSM decodes the data normally and does not attempt any corrections. If the errors in the decrypted HDMI packets are detected (hdcp_ecc_err=1), the IP2 FSM drops the latest Mi value, runs hdcpBlockCipher on the same packet with the previous Mi value from the FILO, and checks errors in the decrypted packet again. In case of errors the IP2 FSM are detected again, the process continues until success or until the FILO becomes empty.

The size of the FILO in this example chosen to be 120, which allows running back up to 120 video fields. For 60 Hz video this corresponds to 2 s. This means that the Roving Pipe has to connect to each input port not rarely than once in 2 s. HDCP 1 is only allowed in TMDS mode. In TMDS mode the hdcp_ecc_err signal is raised when the BCH ECC error occurs. However, the cases then the BCH ECC error happen due to the transmission issues have to be excluded. This is done by filtering out cases when the BCH errors happen together with TERC4 errors. In addition to that, it is useful to discard cases when the number of BCH errors in packet are lower than a threshold. Note that each HDMI packet has 5 BCH blocks, and each block has its own BCH parity check.

An important part of HDCP 1 application of the present disclosure is that is the logic that makes updates for the Ri' register. HDCP DDC Ri register has to be updated every 128 frames. To track this, the diagram in FIG. 15 has mcnt counter. The mcnt counter counts encrypted video fields mod 128. Every 128th encrypted field updates the HDCP DDC's Ri register. When the IP2 FSM re-runs hdcpBlockCipher for a previous frame, it also decrements the counter. This way the Ri register update also gets also synchronized. As was mentioned previously, it is important to do this synchronization before the HDCP DDC's Ri update is due. To make sure this update happens in time, the mcnt value is compared against a firmware-set register that holds a value close to the mcnt maximum value. This register can have default value of 125, for example. Once the mcnt counter reaches the value in the register, the microcontroller gets an interrupt signaling a request to serve corresponding Input Port.

It is noted that many of the terms used herein are terms of art. However, in the event of ambiguity or conflicting vernacular usage, strict definitions can be found in the HDCP specifications published by Digital Content Protection LLC (DCP). Specifically, terms and definitions for HDCP 1.x can be found in the HDCP 1.4 for HDMI specification, which is incorporated by reference in its entirety. Similarly, terms and definitions for HDCP 2.x can be found in the HDCP 2.3 for HDMI specification, which is also incorporated by reference in its entirety. Both of which are published on the DCP website.

Example 1 provides a method for maintaining authentication or reestablishing authentication on an encrypted stream comprising identifying if an inputCtr signal is correct in an HDCP environment, checking a section of the encrypted stream, performing a packet integrity check on a data island packet, performing a packet content check on the data island packet, searching for a correct InputCtr, and resynchronization to the encrypted stream by applying the corrected inputCtr.

Example 2 provides a method for maintaining authentication or reestablishing authentication on an encrypted stream according to any of the preceding and/or proceeding examples, wherein the packet content check comprises performing an error correction code (ECC) calculation.

Example 3 provides a method for maintaining authentication or reestablishing authentication on an encrypted stream according to any of the preceding and/or proceeding examples, wherein the packet integrity check includes performing a BCH code check on the data island packet.

Example 4 provides a method for maintaining authentication or reestablishing authentication on an encrypted stream according to any of the preceding and/or proceeding examples, wherein the packet integrity check includes analyzing reserved bits.

Example 5 provides a method for maintaining authentication or reestablishing authentication on an encrypted stream according to any of the preceding and/or proceeding examples, wherein the packet integrity check includes analyzing repeated patterns.

Example 6 provides a method for maintaining authentication or reestablishing authentication on an encrypted stream according to any of the preceding and/or proceeding examples, wherein the packet integrity check includes evaluating GCP.

Example 7 provides a method for maintaining authentication or reestablishing authentication on an encrypted stream according to any of the preceding and/or proceeding examples, wherein the packet integrity check includes evaluating ACR.

Example 8 provides a method for maintaining authentication or reestablishing authentication on an encrypted stream according to any of the preceding and/or proceeding examples, wherein the packet content checks HDMI VSIF or AVI infoFrame with received video timing.

Example 9 provides a method for maintaining authentication or reestablishing authentication on an encrypted stream according to any of the preceding and/or proceeding examples, wherein searching comprises incrementing a portion of a last successful InputCtr signal.

Example 10 provides a method for maintaining authentication or reestablishing authentication on an encrypted stream according to any of the preceding and/or proceeding examples, wherein the portion includes a FrameNumber.

Example 11 provides a method for maintaining authentication or reestablishing authentication on an encrypted stream according to any of the preceding and/or proceeding examples, wherein searching comprises decrementing a InputCtr signal.

Example 12 provides a method for maintaining authentication or reestablishing authentication on an encrypted stream according to any of the preceding and/or proceeding examples, wherein the FrameNumber from the sink's EDID and detected Video Format, whichever is higher.

Example 13 provides for a method for maintaining authentication or reestablishing authentication on an encrypted stream comprising identifying if a Ki signal is correct in an HDCP environment, checking a section of the encrypted stream, performing a packet integrity check on a data island packet, performing a packet integrity check on a data island packet, performing a packet content check on the data island packet, searching for a correct Ki signal, and resynchronization to the encrypted stream by applying the corrected Ki signal.

Example 14 provides a method for maintaining authentication or reestablishing authentication on an encrypted stream according to any of the preceding and/or proceeding examples, wherein the packet integrity check includes performing a BCH code check on the data island packet.

Example 15 provides a method for maintaining authentication or reestablishing authentication on an encrypted stream according to any of the preceding and/or proceeding examples, wherein searching comprises evaluating an Mi value.

Example 16 provides a method for maintaining authentication or reestablishing authentication on an encrypted stream according to any of the preceding and/or proceeding examples, wherein searching includes Mi in an ascending order of i.

Example 17 provides a method for maintaining authentication or reestablishing authentication on an encrypted stream according to any of the preceding and/or proceeding examples, wherein searching includes Mi in a descending order of i.

Example 18 provides for an apparatus for maintaining authentication or reestablishing authentication on an encrypted stream, the apparatus comprising a means for identifying if an inputCtr signal is correct in an HDCP environment, a means for checking a section of the encrypted stream, a means for performing a packet integrity check on a data island packet, a means for performing a packet content check on the data island packet; means for searching for a correct InputCtr, and a means for resynchronization to the encrypted stream by applying the corrected inputCtr.

Example 19 provides a method for maintaining authentication or reestablishing authentication on an encrypted stream according to any of the preceding and/or proceeding examples, wherein the packet integrity check includes performing a BCH code check on the data island packet.

Example 20 provides a method for maintaining authentication or reestablishing authentication on an encrypted stream according to any of the preceding and/or proceeding examples, wherein the packet integrity check includes analyzing reserved bits.

Example 21 provides a method for maintaining authentication or reestablishing authentication on an encrypted stream according to any of the preceding and/or proceeding examples, wherein the packet integrity check includes analyzing repeated patterns.

The above description of illustrated embodiments, including what is described in the Abstract, is not intended to be exhaustive or limiting as to the precise forms disclosed. While specific implementations of, and examples for, various embodiments or concepts are described herein for illustrative purposes, various equivalent modifications may be possible, as those skilled in the relevant art will recognize. These modifications may be made in light of the above detailed description, the Abstract, the Figures, or the claims.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. For example, those of ordinary skill in the art will readily envision a variety of other means and/or structures for performing the function and/or obtaining the results and/or one or more of the advantages described herein, and each of such variations and/or modifications is deemed to be within the scope of the embodiments described herein.

Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, kits, and/or methods described herein, if such features, systems, articles, materials, kits, and/or methods are not mutually inconsistent, is included within the scope of the present disclosure.

The foregoing outlines features of one or more embodiments of the subject matter disclosed herein. These embodiments are provided to enable a person having ordinary skill in the art (PHOSITA) to better understand various aspects of the present disclosure. Certain well-understood terms, as well as underlying technologies and/or standards may be referenced without being described in detail. It is anticipated that the PHOSITA will possess or have access to background knowledge or information in those technologies and standards sufficient to practice the teachings of the present disclosure.

The PHOSITA will appreciate that they may readily use the present disclosure as a basis for designing or modifying other processes, structures, or variations for carrying out the same purposes and/or achieving the same advantages of the embodiments introduced herein. The PHOSITA will also recognize that such equivalent constructions do not depart from the spirit and scope of the present disclosure, and that they may make various changes, substitutions, and alterations herein without departing from the spirit and scope of the present disclosure.

The above-described embodiments may be implemented in any of numerous ways. One or more aspects and embodiments of the present application involving the performance of processes or methods may utilize program instructions executable by a device (e.g., a computer, a processor, or other device) to perform, or control performance of, the processes or methods.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement one or more of the various embodiments described above.

The computer readable medium or media may be transportable, such that the program or programs stored thereon may be loaded onto one or more different computers or other processors to implement various ones of the aspects described above. In some embodiments, computer readable media may be non-transitory media.

Note that the activities discussed above with reference to the FIGURES which are applicable to any integrated circuit that involves signal processing (for example, gesture signal processing, video signal processing, audio signal processing, analog-to-digital conversion, digital-to-analog conversion), particularly those that can execute specialized software programs or algorithms, some of which may be associated with processing digitized real-time data.

In some cases, the teachings of the present disclosure may be encoded into one or more tangible, non-transitory computer-readable mediums having stored thereon executable instructions that, when executed, instruct a programmable device (such as a processor or DSP) to perform the methods or functions disclosed herein. In cases where the teachings herein are embodied at least partly in a hardware device (such as an ASIC, IP block, or SoC), a non-transitory medium could include a hardware device hardware-programmed with logic to perform the methods or functions disclosed herein. The teachings could also be practiced in the form of Register Transfer Level (RTL) or other hardware description language such as VHDL or Verilog, which can be used to program a fabrication process to produce the hardware elements disclosed.

In example implementations, at least some portions of the processing activities outlined herein may also be implemented in software. In some embodiments, one or more of these features may be implemented in hardware provided external to the elements of the disclosed figures, or consolidated in any appropriate manner to achieve the intended functionality. The various components may include software (or reciprocating software) that can coordinate in order to achieve the operations as outlined herein. In still other embodiments, these elements may include any suitable algorithms, hardware, software, components, modules, interfaces, or objects that facilitate the operations thereof.

Any suitably-configured processor component can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, an FPGA, an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, processors may store information in any suitable type of non-transitory storage medium (for example, random access memory (RAM), read only memory (ROM), FPGA, EPROM, electrically erasable programmable ROM (EEPROM), etc.), software, hardware, or in any other suitable component, device, element, or object where appropriate and based on particular needs. Further, the information being tracked, sent, received, or stored in a processor could be provided in any database, register, table, cache, queue, control list, or storage structure, based on particular needs and implementations, all of which could be referenced in any suitable timeframe.

Any of the memory items discussed herein should be construed as being encompassed within the broad term 'memory.' Similarly, any of the potential processing elements, modules, and machines described herein should be construed as being encompassed within the broad term 'microprocessor' or 'processor.' Furthermore, in various embodiments, the processors, memories, network cards, buses, storage devices, related peripherals, and other hardware elements described herein may be realized by a processor, memory, and other related devices configured by software or firmware to emulate or virtualize the functions of those hardware elements.

Further, it should be appreciated that a computer may be embodied in any of a number of forms, such as a rack-mounted computer, a desktop computer, a laptop computer, or a tablet computer, as non-limiting examples. Additionally, a computer may be embedded in a device not generally regarded as a computer but with suitable processing capabilities, including a personal digital assistant (PDA), a smart phone, a mobile phone, an iPad, or any other suitable portable or fixed electronic device.

Also, a computer may have one or more input and output devices. These devices can be used, among other things, to present a user interface. Examples of output devices that may be used to provide a user interface include printers or display screens for visual presentation of output and speakers or other sound generating devices for audible presentation of output. Examples of input devices that may be used for a user interface include keyboards, and pointing devices, such as mice, touch pads, and digitizing tablets. As another example, a computer may receive input information through speech recognition or in other audible formats.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks or wired networks.

Computer-executable instructions may be in many forms, such as program modules, executed by one or more computers or other devices. Generally, program modules include routines, programs, objects, components, data structures, etc. that performs particular tasks or implement particular abstract data types. Typically, the functionality of the program modules may be combined or distributed as desired in various embodiments.

The terms "program" or "software" are used herein in a generic sense to refer to any type of computer code or set of computer-executable instructions that may be employed to program a computer or other processor to implement various aspects as described above. Additionally, it should be appreciated that according to one aspect, one or more computer programs that when executed perform methods of the present application need not reside on a single computer or processor, but may be distributed in a modular fashion among a number of different computers or processors to implement various aspects of the present application.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

When implemented in software, the software code may be executed on any suitable processor or collection of processors, whether provided in a single computer or distributed among multiple computers.

Computer program logic implementing all or part of the functionality described herein is embodied in various forms, including, but in no way limited to, a source code form, a computer executable form, a hardware description form, and various intermediate forms (for example, mask works, or forms generated by an assembler, compiler, linker, or locator). In an example, source code includes a series of computer program instructions implemented in various programming languages, such as an object code, an assembly language, or a high-level language such as OpenCL, RTL, Verilog, VHDL, Fortran, C, C++, JAVA, or HTML for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

In some embodiments, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), memory elements, etc. can be suitably coupled to the board based on particular configuration needs, processing demands, computer designs, etc.

Other components such as external storage, additional sensors, controllers for audio/video display, and peripheral devices may be attached to the board as plug-in cards, via cables, or integrated into the board itself. In another example embodiment, the electrical circuits of the FIGURES may be implemented as standalone modules (e.g., a device with associated components and circuitry configured to perform a specific application or function) or implemented as plug-in modules into application-specific hardware of electronic devices.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this disclosure.

In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Interpretation of Terms

All definitions, as defined and used herein, should be understood to control over dictionary definitions, definitions in documents incorporated by reference, and/or ordinary meanings of the defined terms. Unless the context clearly requires otherwise, throughout the description and the claims:

"comprise," "comprising," and the like are to be construed in an inclusive sense, as opposed to an exclusive or exhaustive sense; that is to say, in the sense of "including, but not limited to".

"connected," "coupled," or any variant thereof, means any connection or coupling, either direct or indirect, between two or more elements; the coupling or connection between the elements can be physical, logical, or a combination thereof.

"herein," "above," "below," and words of similar import, when used to describe this specification shall refer to this specification as a whole and not to any particular portions of this specification.

"or," in reference to a list of two or more items, covers all of the following interpretations of the word: any of the items in the list, all of the items in the list, and any combination of the items in the list.

the singular forms "a", "an" and "the" also include the meaning of any appropriate plural forms.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", and the like, used in this description and any accompanying claims (where present) depend on the specific orientation of the apparatus described and illustrated. The subject matter described herein may assume various alternative orientations. Accordingly, these directional terms are not strictly defined and should not be interpreted narrowly.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined.

Elements other than those specifically identified by the "and/or" clause may optionally be present, whether related or unrelated to those elements specifically identified. Thus, as a non-limiting example, a reference to "A and/or B", when used in conjunction with open-ended language such as "comprising" may refer, in one embodiment, to A only (optionally including elements other than B); in another embodiment, to B only (optionally including elements other than A); in yet another embodiment, to both A and B (optionally including other elements); etc.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein, the term "between" is to be inclusive unless indicated otherwise. For example, "between A and B" includes A and B unless indicated otherwise.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

Numerous other changes, substitutions, variations, alterations, and modifications may be ascertained to one skilled in the art and it is intended that the present disclosure encompass all such changes, substitutions, variations, alterations, and modifications as falling within the scope of the appended claims.

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke 35 U.S.C. § 112(f) as it exists on the date of the filing hereof unless the words "means for" or "steps for" are specifically used in the particular claims; and (b) does not intend, by any statement in the disclosure, to limit this disclosure in any way that is not otherwise reflected in the appended claims.

The present invention should therefore not be considered limited to the particular embodiments described above. Various modifications, equivalent processes, as well as numerous structures to which the present invention may be applicable, will be readily apparent to those skilled in the art to which the present invention is directed upon review of the present disclosure.

What is claimed is:

1. A method for maintaining authentication or reestablishing authentication on an encrypted stream, the method comprising:
    identifying if an inputCtr signal is correct in a High-bandwidth Digital Content Protection (HDCP) environment, with the inputCtr signal defining a 64-bit counter indicative of a number of encrypted frames since start of HDCP encryption;
    checking a section of the encrypted stream;
    performing a packet integrity check on a data island packet;
    performing a packet content check on the data island packet;
    searching for a correct inputCtr; and
    resynchronizing to the encrypted stream by applying the correct inputCtr without forcing an HDCP reauthentication when HDCP authentication failure is detected.

2. The method according to claim 1, wherein the performing the packet integrity check includes performing a Bose-Chauduri-Hocquenghem (BCH) code check on the data island packet.

3. The method according to claim 1, wherein the performing the packet integrity check includes analyzing reserved bits.

4. The method according to claim 1, wherein the performing the packet integrity check includes analyzing repeated patterns.

5. The method according to claim 4, wherein the performing the packet integrity check includes evaluating General Control Packet (GCP).

6. The method according to claim 4, wherein the performing the packet integrity check includes evaluating audio content recognition (ACR).

7. The method according to claim 1, wherein the performing the packet content check includes checking High-Definition Multimedia Interface (HDMI) Vendor Specific InfoFrame (VSIF) or Auxiliary Video Information (AVI) infoFrame with received video timing.

8. The method according to claim 7, wherein the searching comprises incrementing a portion of a last successful inputCtr signal.

9. The method according to claim 8, wherein the portion includes a FrameNumber defined by the last successful inputCtr signal.

10. The method according to claim 9, wherein the FrameNumber from a sink device's Extended Display Identification Data (EDID) and detected Video Format, whichever is higher.

11. The method according to claim 7, wherein the searching comprises decrementing a current inputCtr signal.

12. A method for maintaining authentication or reestablishing authentication on an encrypted stream, the method comprising:
- identifying if a Ki signal is correct in a High-bandwidth Digital Content Protection (HDCP) environment, with index i representing a frame number of a video frame and the Ki signal defining a 56-bit key to initialize a HDCP cipher;
- checking a section of the encrypted stream;
- performing a packet integrity check on a data island packet;
- performing a packet content check on the data island packet;
- searching for a correct Ki signal; and
- resynchronizing to the encrypted stream by applying the correct Ki signal without forcing an HDCP reauthentication when HDCP failure is detected.

13. The method according to claim 12, wherein the performing the packet integrity check includes performing a Bose-Chauduri-Hocquenghem (BCH) code check on the data island packet.

14. The method according to claim 12, wherein the searching comprises evaluating an $M_i$ value, with the $M_i$ value being a 64-bit initialization value for the HDCP cipher.

15. The method according to claim 14, wherein the searching includes updating the $M_i$ value in an ascending order of i.

16. The method according to claim 14, wherein the searching includes updating the $M_i$ value in a descending order of i.

17. An apparatus to maintain authentication or reestablish authentication on an encrypted stream, the apparatus comprising:
- processing circuitry configured at least to:
  - identify if an inputCtr signal is correct in a High-bandwidth Digital Content Protection (HDCP) environment, with the inputCtr signal defining a 64-bit counter indicative of a number of encrypted frames since start of HDCP encryption;
  - check a section of the encrypted stream;
  - perform a packet integrity check on a data island packet;
  - perform a packet content check on the data island packet;
  - search for a correct InputCtr; and
  - resynchronize to the encrypted stream by applying the correct inputCtr without forcing an HDCP reauthentication when HDCP failure is detected.

18. The apparatus according to claim 17, wherein the packet integrity check includes performing a Bose-Chauduri-Hocquenghem (BCH) code check on the data island packet.

19. The apparatus according to claim 17, wherein the packet integrity check includes analyzing reserved bits.

20. The apparatus according to claim 17, wherein the packet integrity check includes analyzing repeated patterns.

* * * * *